(12) United States Patent  (10) Patent No.: US 8,289,593 B2
Sugahara et al.  (45) Date of Patent: Oct. 16, 2012

(54) MULTIFUNCTION PRINTER, PRINTING SYSTEM, AND PROGRAM FOR COMBINING PORTIONS OF TWO OR MORE IMAGES

(75) Inventors: Hiroto Sugahara, Aichi-ken (JP); Kazuma Goto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1236 days.

(21) Appl. No.: 12/052,571

(22) Filed: Mar. 20, 2008

(65) Prior Publication Data

US 2008/0231892 A1 Sep. 25, 2008

(30) Foreign Application Priority Data

Mar. 22, 2007 (JP) ................................. 2007-074061

(51) Int. Cl.
*H04N 1/46* (2006.01)
*H04N 1/60* (2006.01)
*G06T 5/00* (2006.01)
*G06K 9/36* (2006.01)
*G06K 9/32* (2006.01)

(52) U.S. Cl. ......... 358/537; 358/538; 358/540; 358/1.9; 358/3.27; 382/284; 382/287; 382/294

(58) Field of Classification Search .................. None
See application file for complete search history.

(56) References Cited

U.S. PATENT DOCUMENTS

| | | | | |
|---|---|---|---|---|
| 4,627,707 A | * | 12/1986 | Tani et al. ...................... 399/184 |
| 4,888,615 A | * | 12/1989 | Araki et al. ................... 399/183 |
| 5,960,109 A | * | 9/1999 | Shiau ............................ 382/164 |
| 6,883,892 B2 | * | 4/2005 | Sievert et al. .................... 347/19 |
| 7,009,726 B2 | * | 3/2006 | Lumley ........................ 358/1.15 |
| 7,024,053 B2 | * | 4/2006 | Enomoto ....................... 382/284 |
| 7,221,470 B2 | | 5/2007 | Takamine et al. | |

(Continued)

FOREIGN PATENT DOCUMENTS

EP 0686945 A2 12/1995

(Continued)

OTHER PUBLICATIONS

European Patent Office; European Search Report in European Patent Application No. 08005208.7 (counterpart to the above-captioned U.S. patent application) mailed Dec. 21, 2009.

*Primary Examiner* — David K Moore
*Assistant Examiner* — Peter L Cheng
(74) *Attorney, Agent, or Firm* — Baker Botts L.L.P.

(57) ABSTRACT

A multifunction printer includes a scanner; a memory which stores a plurality of still image data; a printing head which prints, on a first printing medium, thumbnail images corresponding to the plurality of still image data; an image data-extracting section which extracts a base image data and a correction image data when the first printing medium is read by the scanner after a predetermined base image selection mark has been marked by a user to one of the plurality of thumbnail images printed on the first printing medium and a predetermined correction position mark has been marked to a partial area of the thumbnail image and which cuts out, from the correction image data, correction data corresponding to the area marked with the correction position mark, and an image-combining section which combines the base image data with the correction data to generate combined image data.

19 Claims, 25 Drawing Sheets

U.S. PATENT DOCUMENTS

| | | |
|---|---|---|
| 2003/0107773 A1 | 6/2003 | Takamine et al. |
| 2003/0190089 A1* | 10/2003 | Katsuda et al. ............... 382/284 |
| 2004/0190059 A1 | 9/2004 | Winter et al. |
| 2005/0128510 A1 | 6/2005 | Campbell |
| 2005/0185158 A1* | 8/2005 | Matsuhira ..................... 355/40 |
| 2005/0229107 A1* | 10/2005 | Hull et al. .................... 715/764 |
| 2006/0050321 A1 | 3/2006 | Takahashi |
| 2006/0242567 A1 | 10/2006 | Rowson et al. |
| 2007/0065044 A1 | 3/2007 | Park et al. |

FOREIGN PATENT DOCUMENTS

| | | | |
|---|---|---|---|
| EP | 1696658 A1 | | 8/2006 |
| JP | 2003264660 A | | 9/2003 |
| JP | 2005080076 A | * | 3/2005 |
| JP | 2006080652 A | | 3/2006 |

* cited by examiner

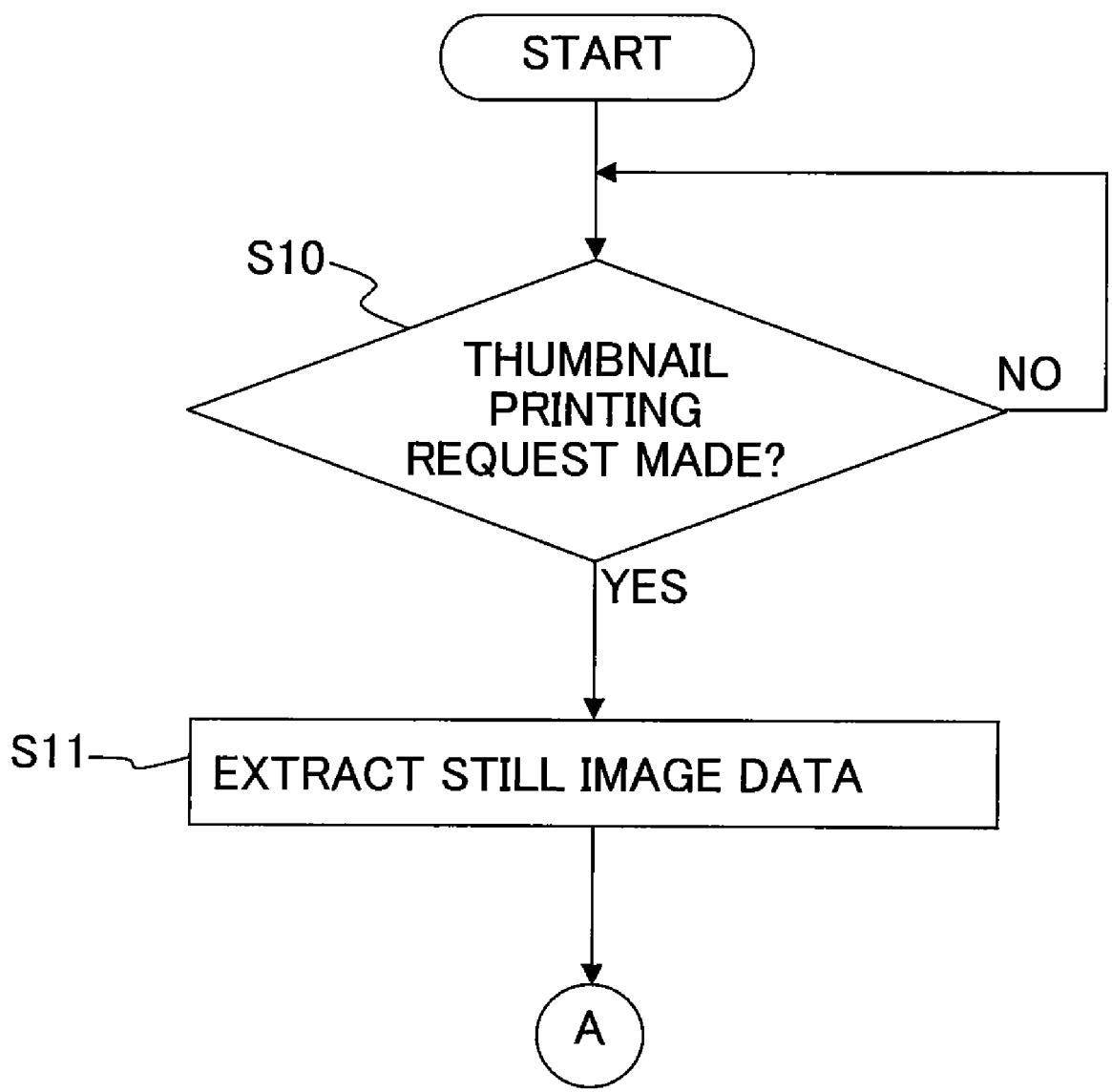

MULTIFUNCTION PRINTER, PRINTING SYSTEM, AND PROGRAM FOR COMBINING PORTIONS OF TWO OR MORE IMAGES

CROSS REFERENCE TO RELATED APPLICATION

The present application claims priority from Japanese Patent Application No. 2007-074061, filed on Mar. 22, 2007, the disclosure of which is incorporated herein by reference in its entirety.

BACKGROUND OF THE INVENTION

1. Field of the Invention

The present invention relates to a multifunction printer, a printing system including the multifunction printer, and a still image printing program to be used for the multifunction printer.

2. Description of the Related Art

A technique has been hitherto known, in which a piece of still image data of a desired scene is extracted from a piece of movie image data composed of a plurality of pieces of still image data arranged in a chronological order, and an image of the still image data (still image) is printed on a printing medium. For example, an image output device, which is described in U.S. Pat. No. 7,221,470 (corresponding to Japanese Patent Application Laid-open No. 2003-264660), temporarily stores a plurality of pieces of still image data (frames) contained in movie image data. When an instruction to print a still image is inputted by the remote control operation by a user, a plurality of (for example, two) still images, which are disposed in the vicinity of the time at which the printing instruction is inputted, are displayed on a screen. Further, when an image, which is to be printed, is specified from the plurality of displayed images by the remote control operation by the user, the data of the specified image is outputted to an image-forming device (for example, a color printer).

However, the device described in U.S. Pat. No. 7,221,470 has the following problem. That is, if any defective portion (unfavorite point for the user) is present in only a part of a still image, for example, such that a person is photographed at that moment with eyes closed in the selected image selected by the user, then the image is not satisfactory as a whole, even when the image is satisfactory in all points except for the above. It is impossible to print any still image which is favorite for the user.

SUMMARY OF THE INVENTION

An object of the present invention is to provide a multifunction printer which makes it possible to print a satisfactory still image by correcting any defective portion even when the defective portion is present in a part of a still image selected by a user.

According to a first aspect of the present invention, there is provided a multifunction printer including: a scanner which reads an image printed on a printing medium; a memory which stores a plurality of pieces of still image data; a printing head which prints, on a first printing medium, a plurality of thumbnail images corresponding to the plurality of pieces of the still image data stored in the memory; an image data-extracting section which includes a base image-extracting section and a correction data-extracting section, the base image-extracting section being provided to extract, as base image data, a piece of the still image data corresponding to the thumbnail image marked with a base image selection mark from the plurality of pieces of the still image data stored in the memory when the first printing medium is read by the scanner after the predetermined base image selection mark is marked by a user to one of the plurality of thumbnail images printed on the first printing medium and a predetermined correction position mark is marked to a partial area of at least one of the thumbnail images, and the correction data-extracting section being provided to extract at least one piece of the still image data as correction image data from the plurality of pieces of the still image data stored in the memory and cut out data corresponding to the partial area marked with the correction position mark as correction data for correcting a part of the base image data from the correction image data; and an image-combining section which combines the base image data extracted by the base image-extracting section with the correction data extracted by the correction data-extracting section to generate combined image data, wherein: the printing head prints, on a second printing medium, an image of the combined image data generated by the image-combining section.

According to the multifunction printer of the present invention, at first, the thumbnail images of the plurality of the still image data arranged in a chronological order, which are stored in the memory, are printed on the first printing medium by the printing head. After that, the base image selection mark is marked by the user to one of the plurality of thumbnail images on the first printing medium in order to select the base image. Further, the correction position mark, which is provided to indicate the correction position, is marked to the partial area of at least one of the thumbnail images.

The correction position mark is the mark to indicate which area is to be corrected in the base image selected by the base image selection mark. Therefore, the correction position mark may be marked to any thumbnail image of the plurality of thumbnail images printed on the first printing medium. That is, the thumbnail image, to which the correction position mark is marked, may be different from or the same as the thumbnail image to which the base image selection mark is marked. It is not necessarily indispensable that the correction position mark is directly marked to the thumbnail image. The correction position mark may be marked at any position separated from the thumbnail image provided that the position at which the correction position mark is marked is successfully correlated with the area in which the thumbnail image is present.

When the first printing medium, to which the base image selection mark and the correction position mark are marked, is read by the scanner, the base image data, which corresponds to the thumbnail image marked with the base image selection mark, is firstly extracted from the plurality of pieces of the still image data stored in the memory by the base image-extracting section. Further, the correction data-extracting section extracts the correction image data for correcting the base image from the plurality of pieces of the still image data, the correction image data being instructed by the user or automatically set depending on the base image data. Further, the data, which is included in the correction image data and which corresponds to the correction position mark, is extracted as the correction data. The base image data and the correction data are combined or synthesized by the image-combining section, and thus the combined image data is generated. The image of the combined image data is outputted to the second printing medium.

Accordingly, for example, when any defective portion (portion unfavorite for the user) is present at a part of the base image which is the image desired to be printed by the user, the part can be replaced with the correction data which is extracted from the correction image data distinct from the base image data. It is possible to print the satisfactory image in which any defective portion is absent.

The combined image, in which a part of the base image is corrected, is automatically printed on the second printing medium such that the user views the list indication of the thumbnail images of the plurality of pieces of the still image data printed on the first printing medium and the user merely marks the base image selection mark and the correction position mark to the first printing medium to allow the scanner to read the printing medium. Therefore, it is unnecessary to perform any special operation which is not performed by the user during the ordinary image printing in order to print the combined image. Therefore, even in the case of the user who is weak in the equipment operation, it is possible to easily and conveniently print the combined still image of the desired scene in the moving image.

In the multifunction printer of the present invention, the plurality of pieces of the still image data stored in the memory may be arranged in a chronological order.

In the multifunction printer of the present invention, when the base image selection mark and the correction position mark are marked respectively to the thumbnail images which are different from each other, the correction data-extracting section may extract, as the correction image data, the still image data corresponding to the thumbnail image marked with the correction position mark. When the correction position mark is marked by the user to the distinct thumbnail image which is different from the thumbnail image marked with the base image selection mark, the correction data-extracting section judges that the instruction is made to correct the base image data by using the still image data corresponding to the correction position mark. The still image data, which corresponds to the thumbnail image marked with the correction position mark, is extracted as the correction image data. The data, which is included in the correction image data and which corresponds to the correction position mark, is cut out as the correction data. Therefore, the user can simultaneously perform the designation of the correction image data and the correction position by merely marking the correction position mark directly to the thumbnail image of the still image data to be used to correct the base image.

In the multifunction printer of the present invention, when the base image selection mark and the correction position mark are marked to the same thumbnail image, the still image data, which is different from the still image data corresponding to the thumbnail image marked with the correction position mark, may be extracted as the correction image data by the correction data-extracting section. When the base image selection mark and the correction position mark are marked by the user to the same thumbnail image, the correction data-extracting section judges that the correction position mark merely indicates the position of the area to be corrected in the base image. The still image data, which is distinct from the still image data corresponding to the thumbnail image marked with the two types of the marks, is extracted as the correction image data. The data, which corresponds to the correction position mark of the correction image data, is cut out as the correction data.

In the multifunction printer of the present invention, when the correction position mark is marked onto the thumbnail image, the data, which is included in the correction image data and which corresponds to an area including the correction position mark on the thumbnail image, may be cut out as the correction data by the correction data-extracting section. According to this arrangement, the data, which corresponds to the area marked with the correction position mark, of the thumbnail image, is cut out as the correction data. Therefore, the user can easily designate the correction area by directly marking the correction position mark to the area in which the base image is intended to be corrected, on the thumbnail image.

In the multifunction printer of the present invention, when the correction position mark is marked to surround a part of the thumbnail image, the data, which corresponds to the area surrounded by the correction position mark of the thumbnail image, may be cut out as the correction data from the correction image data by the correction data-extracting section. When the correction position mark is marked to surround a part of the thumbnail image as described above, the correction data-extracting section judges that the area surrounded by the correction position mark is the area to be corrected, and the data of the area is cut out as the correction data. In this case, the user can instruct the correction area more finely by surrounding only the area intended to be corrected.

In the multifunction printer of the present invention, comparting lines, which compart each of the thumbnail images into a plurality of block areas, may be printed together with the plurality of thumbnail images on the first printing medium by the printing head, and the data, which corresponds to the block area including the correction position mark of the thumbnail image, may be cut out as the correction data from the correction image data by the correction data-extracting section.

When each of the thumbnail images is comparted into the plurality of block areas by the comparting lines, the correction data-extracting section cuts out, as the correction data, the data of the block area including the correction position mark. In this case, it is enough that the correction position mark is marked in a certain block area to instruct the certain block area. Any shape is available for the mark. In other words, it is not necessarily indispensable that the correction position mark is formed to have the shape to surround a partial area of the thumbnail image as described above.

In the multifunction printer of the present invention, two or more pieces of the correction image data may be extracted from the plurality of pieces of the still image data stored in the memory by the correction data-extracting section, two or more pieces of the correction data, each of which correspond to the partial area, may be cut out from the two or more pieces of the correction image data, the base image data and the two or more pieces of the correction data may be combined with each other to generate two or more pieces of to-be-printed data by the image-combining section, and two or more to-be-printed thumbnail images, which correspond to the two or more pieces of the to-be-printed data respectively, may be printed on a third printing medium by the printing head, wherein the multifunction printer further includes a printing image-identifying section which identifies a specific to-be-printed data, from the two or more to-be-printed data, corresponding to a printing selection mark marked by a user on the third printing medium, when the third printing medium is read by the scanner after the user has marked the predetermined printing selection mark to any one of the two or more to-be-printed thumbnail images printed on the third printing medium, and wherein an image of the specific to-be-printed data, which is identified by the printing image-identifying section, may be printed on the second printing medium by the printing head. According to this arrangement, the two or more pieces of the correction image data are extracted for one piece of the base image data to generate the two or more pieces of the to-be-printed data. The thumbnail images of the two or more of the to-be-printed data are printed on the third printing medium. Therefore, one thumbnail image, which is most favorite for the user, is selected by the user from the thumbnail images of the to-be-printed images, and thus the more satisfactory image is printed on the second printing medium.

In the multifunction printer of the present invention, a moving image identification mark, which is provided to identify the movie image data, may be printed on the first printing medium together with the plurality of thumbnail images by the printing head, and the movie image data, from which the base image data and the correction image data are to be extracted, may be recognized from the moving image identification mark printed on the first printing medium by the image data-extracting section. According to this arrangement, when the first printing medium, to which the base image selection mark and the correction position mark are marked, is read by the scanner, the image data-extracting section recognizes the movie image data from which the base image data and the correction image data are to be extracted, from the moving image identification mark printed on the first printing medium. Therefore, it is unnecessary for the multifunction printer to inquire of the user from which movie image data the base image data and the correction image data are to be extracted.

In the multifunction printer of the present invention, the plurality of pieces of the still image data may be classified into a plurality of groups, a group identification mark, which corresponds to each of the plurality of groups, may be printed by the printing head on one sheet of the first printing medium together with the thumbnail images of the still image data belonging to the group, and the group, from which the base image data and the correction image data are to be extracted, may be recognized by the image data-extracting section from the group identification mark printed on the first printing medium. When the thumbnail images are shown in a list over a plurality of sheets of the first printing medium, the plurality of pieces of the still image data are classified or divided into a plurality of groups in order to determine on which first printing medium the corresponding thumbnail image is printed. The thumbnail images of the still image data belonging to one group are printed on the same first printing medium, and the group identification mark corresponding to the group is printed on the same first printing medium. When the first printing medium, which is marked with the base image selection mark and the correction position mark, is read by the scanner, the image data-extracting section recognizes the group from which the base image data and the correction image data are to be extracted, from the group identification mark printed on the first printing medium. Therefore, it is unnecessary for the multifunction printer to inquire of the user from which group the base image data and the correction image data are to be extracted.

According to a second aspect of the present invention, there is provided a printing system comprising the multifunction printer as defined in the first aspect, and a controller which controls the multifunction printer.

According to the printing system of the second aspect of the present invention, for example, when any defective portion (portion unfavorite for the user) is present in a part of the base image which is the image intended to be printed by the user, a part thereof can be replaced with the correction data extracted from the correction image data distinct from the base image data, in the same manner as in the first aspect. It is possible to print the satisfactory image.

According to a still image-printing program of a third aspect of the present invention, the effect, which is the same as or equivalent to that of the first aspect, can be obtained.

BRIEF DESCRIPTION OF THE DRAWINGS

FIGS. 3A and 3B show a flow chart illustrating a still image-printing process.

DESCRIPTION OF THE PREFERRED EMBODIMENTS

Figure 1:
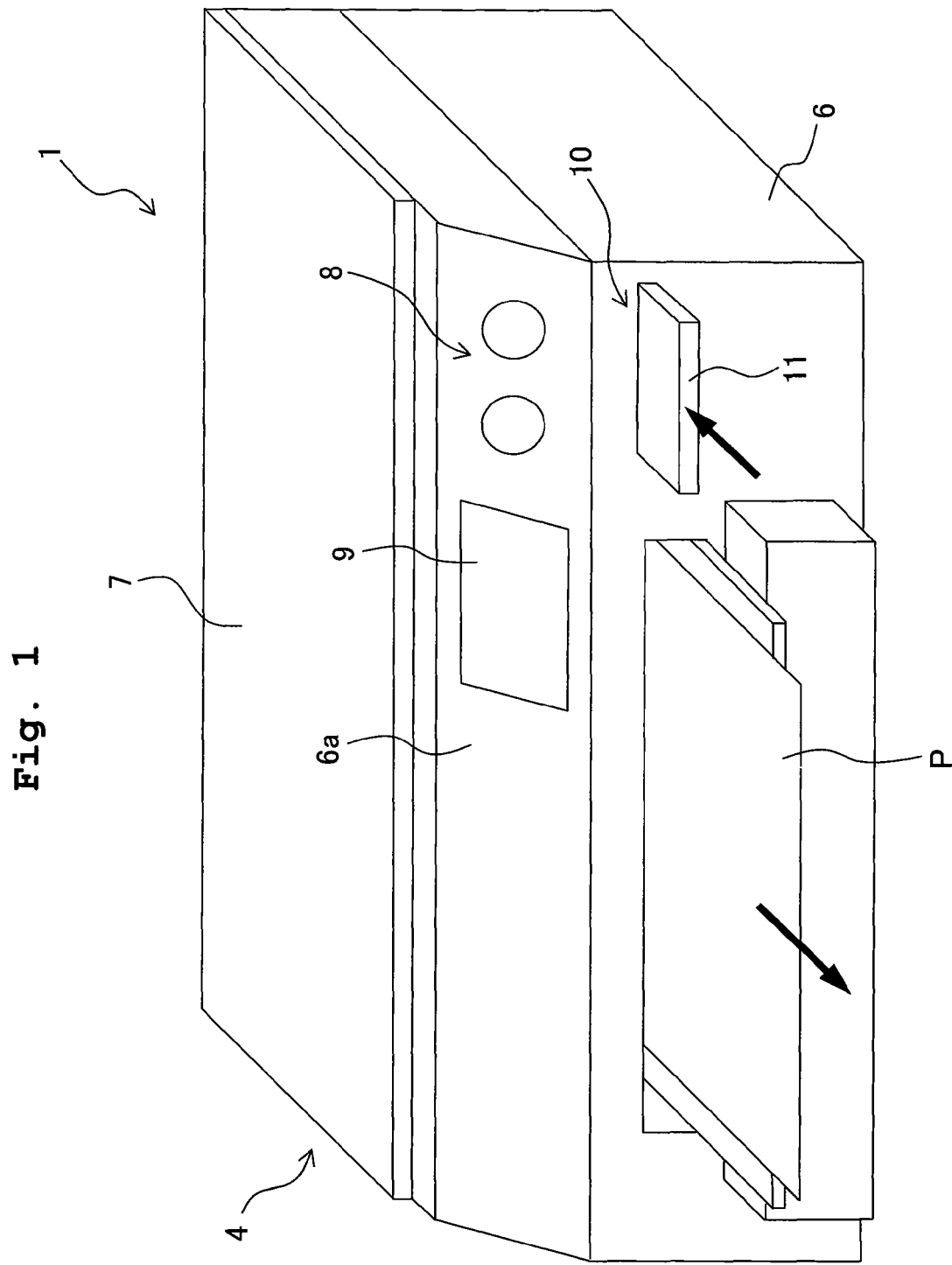
FIG. 1 schematically shows an appearance of a multifunction printer according to a first embodiment of the present invention.
Figure 2:
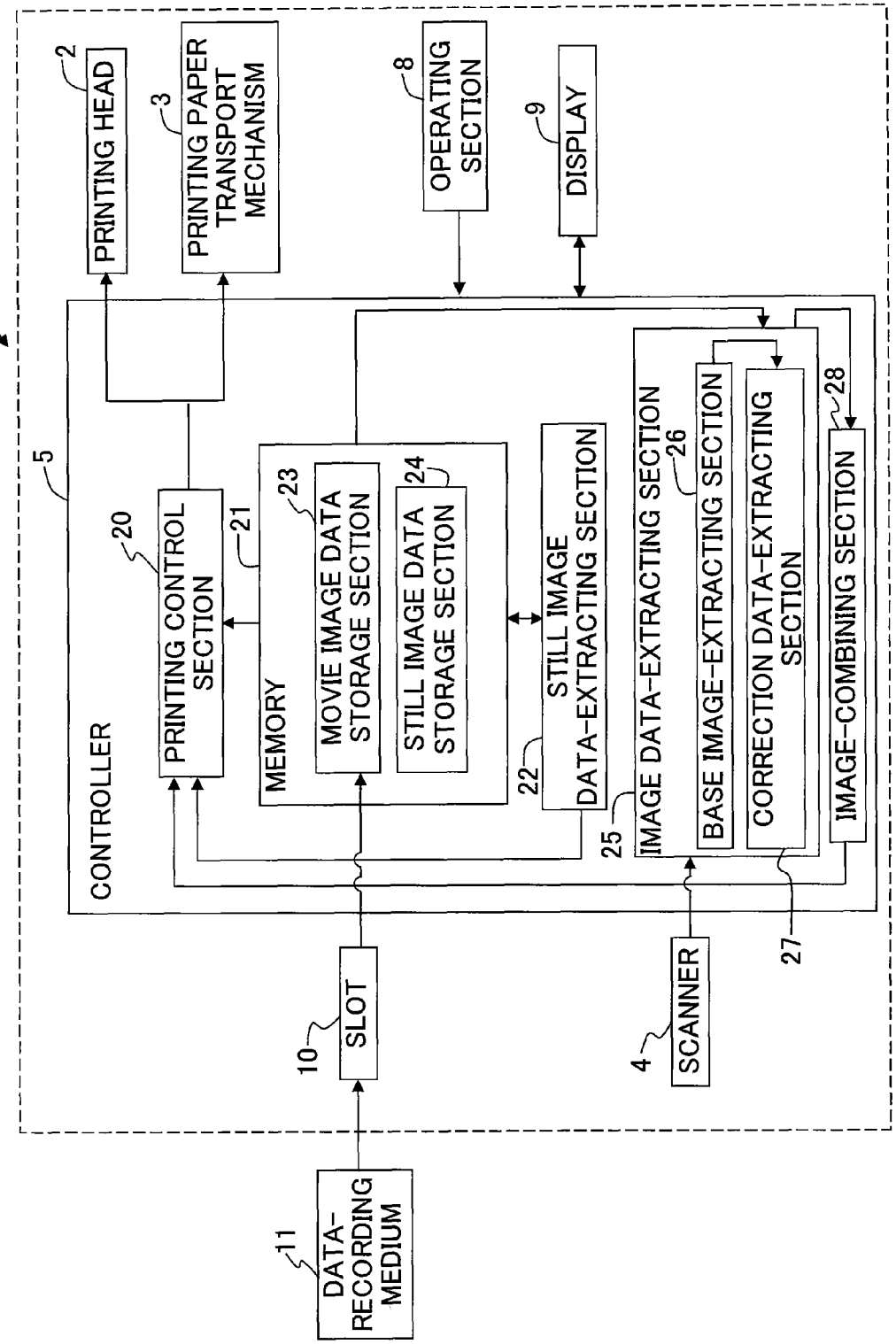
FIG. 2 shows a block diagram schematically illustrating an electric configuration of the multifunction printer.
Figure 3B:
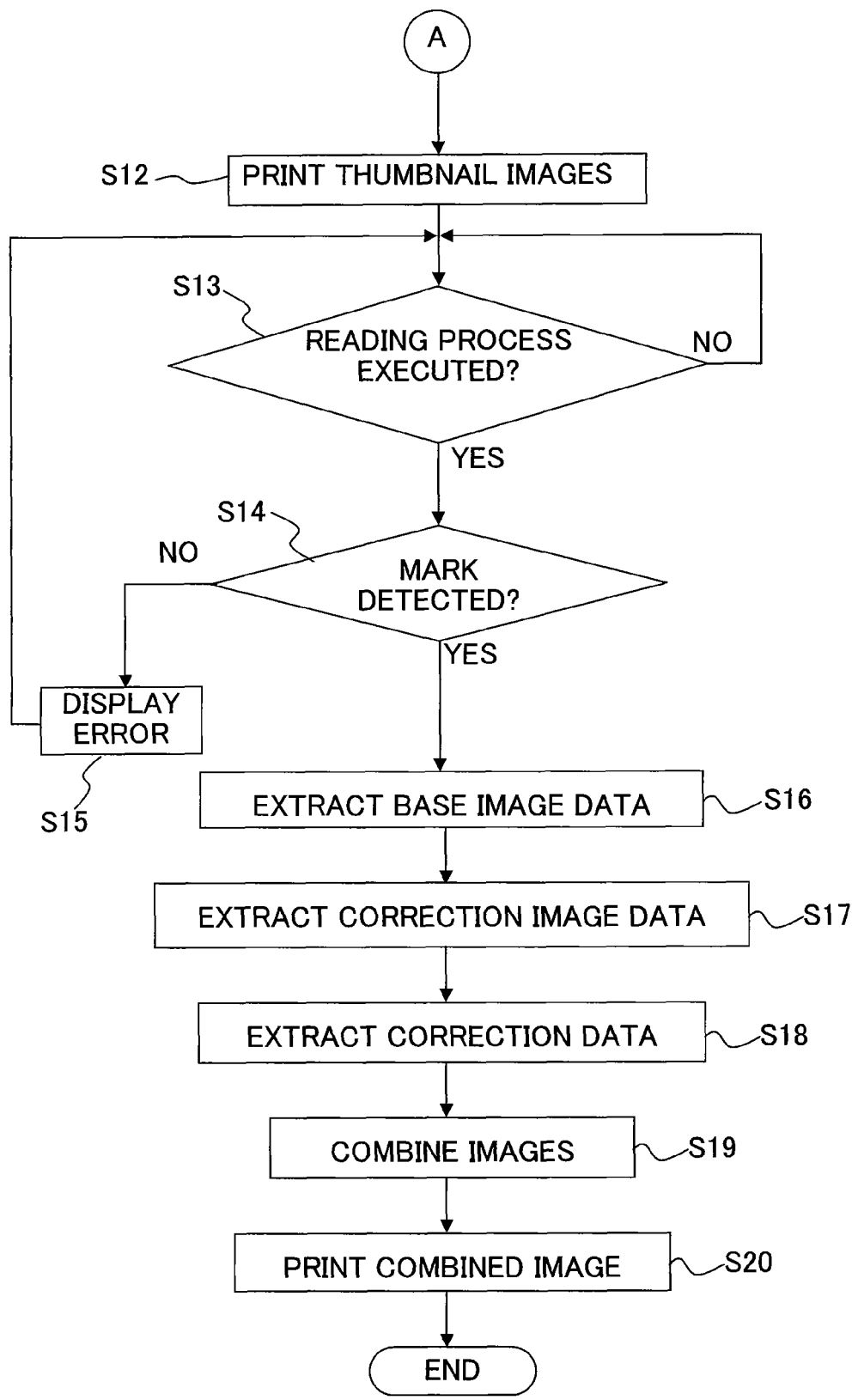

Next, a first embodiment of the present invention will be explained. FIG. 1 schematically shows an appearance of a multifunction printer according to the first embodiment. FIG. 2 shows a block diagram schematically illustrating an electric configuration of the multifunction printer.

As shown in FIGS. 1 and 2, the multifunction printer 1 of this embodiment comprises a printing head 2 which prints an image on the printing paper P (printing medium), a printing paper transport mechanism 3 which transports the printing paper P in a predetermined direction (frontward direction as shown in FIG. 1), a scanner 4 which reads the image printed on the printing paper P, and a controller 5 which controls various mechanisms of the multifunction printer 1 including, for example, the printing head 2, the printing paper transport mechanism 3, and the scanner 4 respectively.

As shown in FIG. 1, the multifunction printer 1 has a main printer body 6 having a substantially rectangular parallelepiped shape. For example, the printing head 2 and the printing paper transport mechanism 3 are accommodated in the main printer body 6. Those usable as the printing head 2 include those based on the known system including, for example, the ink-jet system, the laser system, and the thermal transfer system for performing the printing on the printing paper P. The printing paper transport mechanism 3 is constructed such that the printing paper P is transported in the predetermined direction by the transport rollers driven and rotated by a motor.

The scanner 4 is provided at an upper portion of the main printer body 6. As shown in FIG. 1, the scanner 4 is provided with a placing stand (not shown) which is composed of a glass plate, a reading unit (not shown) which is arranged under the placing stand, and a cover 7 which covers the upper surface of the placing stand. The scanner 4 is constructed such that an image, which is printed on a manuscript, is read by the reading unit in a state in which the cover 7 is closed after the manuscript is placed on the upper surface of the placing stand.

An inclined surface 6a is formed at a front upper portion of the main printer body 6. The inclined surface 6a is provided with an operating section 8 which is composed of a plurality of operation buttons to be operated by a user, and a display 9 which displays, for example, the error message and the operation state of the multifunction printer 1. A slot 10, to which a data-recording medium 11 such as a memory card is installed, is provided at a front right portion of the main printer body 6. The data including, for example, the movie image data and the image data recorded on the data-recording medium 11 is read in the slot 10, and the data is inputted into the controller 5.

In the following description, it is assumed that various pieces of the data such as the movie image data are inputted from the data-recording medium 11 via the slot 10 into the multifunction printer 1 for the convenience of explanation. However, the data input into the multifunction printer 1 is not limited to such a system. For example, the multifunction printer 1 may be connected to a digital video camera by a cable, and the data may be inputted into the multifunction printer 1 via the cable. Alternatively, the data may be inputted into the multifunction printer 1, for example, from a mobile phone equipped with the video photographing function via the wireless communication based on the use of, for example, the infrared light.

Next, an explanation will be made with reference to FIG. 2 about the electric configuration of the multifunction printer 1 including the central unit of the controller 5. The controller 5 comprises, for example, CPU (Central Processing Unit) which serves as the central processing unit, ROM (Read Only Memory) which stores, for example, the program and the data to control the various mechanisms of the multifunction printer 1, RAM (Random Access Memory) which temporarily stores the data to be processed by CPU, and an input/output interface which inputs/outputs the signal with respect to the external device.

As shown in FIG. 2, the controller 5 has a printing control section 20, and a storage section 21 (memory) which stores the image data and the movie image data inputted from the data-recording medium 11 installed to the slot 10. When the printing instruction is inputted from the operating section 8 by the user, the printing control section 20 controls the printing head 2 and the printing paper transport mechanism 3 respectively based on the data stored in the storage section 21. Accordingly, the desired image is printed on the printing paper P in this arrangement. Further, the controller 5 displays, on the display 9, for example, the error message and the state of the multifunction printer 1 (printing state or waiting state) to inform the user of the information.

Additionally, the multifunction printer 1 of the first embodiment has the following unique feature which is not possessed by any conventional multifunction machine. At first, a plurality of pieces of the still image data are extracted from the movie image data inputted from the data-recording medium 11 in response to the request from the user via the operating section 8 so that thumbnail images 30 (reduced images) of the plurality of pieces of the still image data are printed on the printing paper P (thumbnail image-printing process: see FIG. 5).

Further, when the printing paper sheet P1 is read by the scanner 4 in a state in which a base image selection mark 31 for selecting a base image and a correction position mark 32 for instructing a correction area as a part of the base image are marked to the printing paper sheet P1 (first printing medium) printed with the thumbnail images 30 (see FIG. 6), the base image data corresponding to the base image selection mark 31 is combined with the correction data cut out or sliced out corresponding to the correction position mark 32 from the still image data (correction image data) which is distinct from the base image data. In this arrangement, a combined image 38 (image in which a part of the base image is corrected) can be printed on another printing paper sheet P2 (second printing medium) (combined image-printing process, see FIG. 7). This unique feature will be explained in detail below.

As shown in FIG. 2, the controller 5 has a still image data-extracting section 22 which extracts the plurality of pieces of the still image data for the list indication or display (thumbnail indication) arranged in a chronological order, from the inputted movie image data. Further, the storage section 21 of the controller 5 has a movie image data storage section 23 which temporarily stores the movie image data inputted from the data-recording medium 11, and a still image data storage section 24 which stores the plurality of still image data extracted by the still image data-extracting section 22 from the movie image data. Further, the controller 5 is provided with an image data-extracting section 25 including a base image-extracting section 26 which extracts the still image data (base image data) corresponding to the base image selection mark 31 when the printing paper sheet P1, to which the base image selection mark 31 and the correction position mark 32 are marked by the user, is read by the scanner 4, and a correction data-extracting section 27 which extracts the correction data corresponding to the correction position mark 32. Further, the controller 5 is provided with an image-combining section 28 which combines the base image data extracted by the image data-extracting section 25 with the correction data to generate the combined image data.

The printing control section 20, the storage section 21, the still image data-extracting section 22, the image data-extracting section 25, and the image-combining section 28 described above are realized, for example, by CPU, ROM, and RAM which constitute the controller 5. In other words, ROM of the controller 5 stores a still image-printing program in order to extract the still image data from the movie image data and print the still image data. The respective functions of, for example, the printing control section 20, the storage section 21, the still image data-extracting section 22, the image data-extracting section 25, and the image-combining section 28 are realized by executing the program stored in ROM by CPU of the controller 5.

Next, an explanation will be made with reference to a flow chart shown in FIG. 3 and FIGS. 4 to 8 about a series of the still image-printing process including the thumbnail image-printing process and the combined image-printing process realized by the controller 5 of the first embodiment. However, in FIG. 3, Si (i=10, 11, 12 . . . ) indicates each of the steps.

Next, the thumbnail image-printing process will be explained. At first, when the instruction, which requires the execution of the thumbnail image printing for the predetermined movie image data recorded on the data-recording medium 11, is inputted from the operating section 8 by the user (S10: Yes), the still image data-extracting section 22 extracts a plurality of pieces of the still image data arranged in the chronological order from the movie image data (S11).

More specifically, at first, when the instruction of the thumbnail image printing is inputted by the user via the operating section 8 in a state in which the data-recording medium 11 is inserted into the slot 10, the controller 5 displays, on the display 9, a list of the movie image data (file names) stored in the data-recording medium 11. When one piece of the movie image data, which is included in the list, is selected by the user by the aid of the operating section 8, then the selected movie image data is read by the slot 10, and the movie image data is temporarily stored in the movie image data storage section 23.

Figure 4:
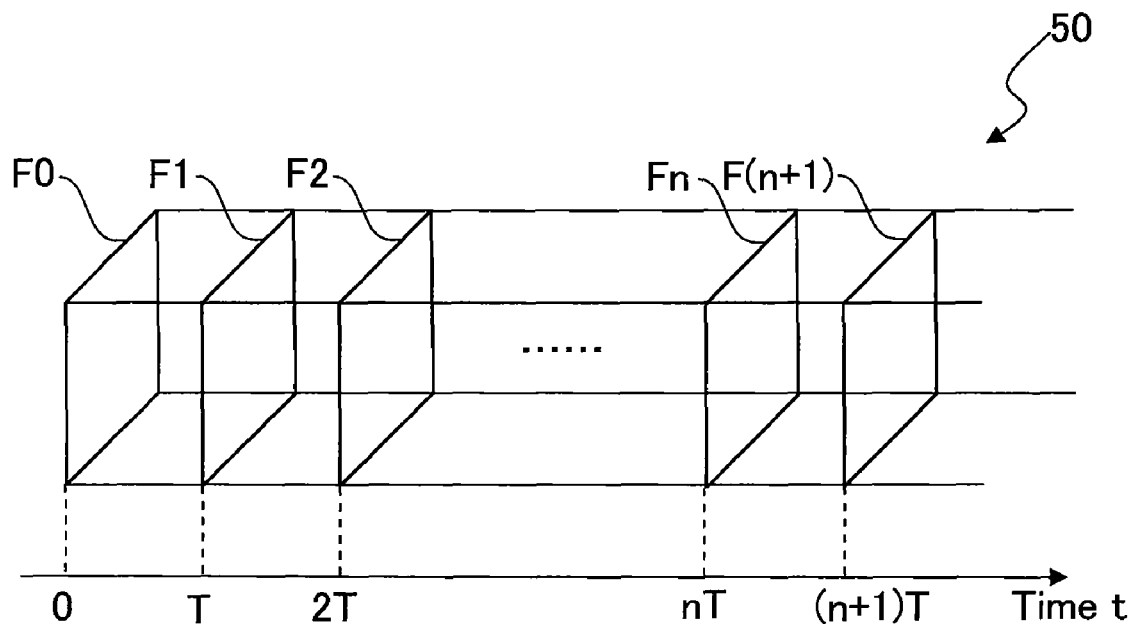
FIG. 4 conceptually shows the extraction of still image data.

As shown in FIG. 4, the still image data-extracting section 22 cuts out or slices out a plurality of pieces of the still image data (frames) arranged in the chronological order, at equal time intervals T from the movie image data 50 stored in the movie image data storage section 23. That is, a plurality of frames (F0, F1, F2, . . . , Fn, F(n+1), . . . ), at which the times (points or moments of time) t as counted in the movie image data 50 are 0, T, 2T, . . . , nT, (n+1)T respectively, are extracted. Further, the thumbnail image data for the list indication, in which the image size is decreased, are prepared for the plurality of pieces of the extracted still image data respectively. The plurality of pieces of the still image data and the plurality of pieces of the thumbnail image data, which are extracted as described above, are stored in the still image data storage section 24 while being correlated with the movie image data from which the pieces of the still image data are extracted.

The time interval T, at which the still image data-extracting section 22 extracts the plurality of pieces of the still image data for the list indication from the movie image data 50, may be a preset fixed value or any value which is to be arbitrarily set by the user by the aid of the operating section 8. Alternatively, the still image data-extracting section 22 may set an appropriate value of the time interval T depending on the total period of time of the movie image data as the data extraction objective. For example, when the still image data are extracted from the movie image data in which the total period of time is long, the time interval T is increased. On the other hand, when the still image data are extracted from the movie image data in which the total period of time is short, the time interval T is decreased (made fine).

When the processes are completed as described above, the printing head 2 is controlled by the printing control section 20 so that the plurality of thumbnail images 30, which correspond to the plurality of the extracted still image data, are printed on the printing paper sheet P1, and the thumbnail images 30 are shown in a list (S12: first printing step).

Figure 5:
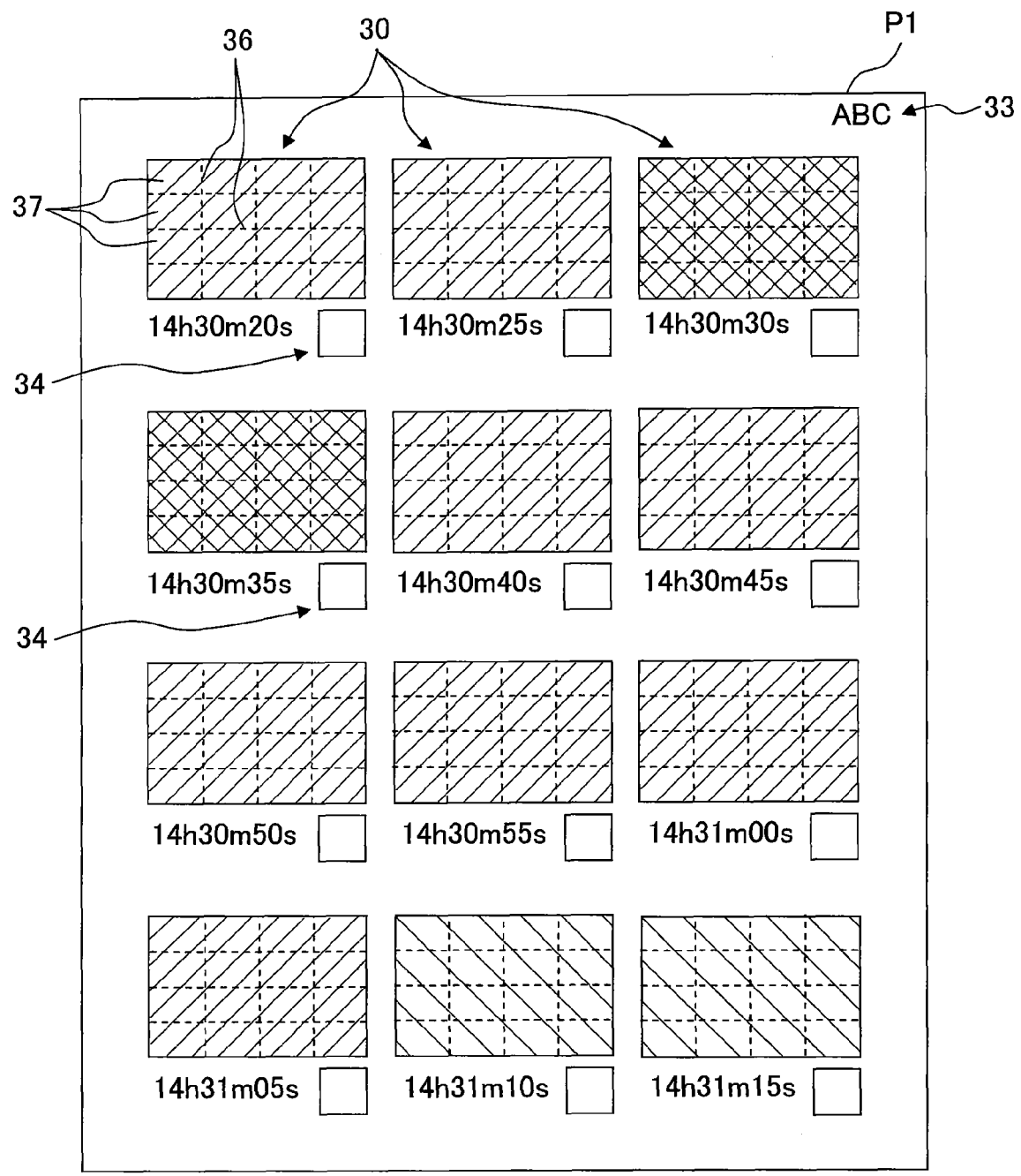
FIG. 5 shows a state in which a plurality of thumbnail images are printed on a printing paper sheet.

FIG. 5 shows a specified example of the printing of the plurality of thumbnail images 30. In FIG. 5, twelve of the thumbnail images 30, which are included in the thumbnail images 30 of the plurality of pieces of the still image data extracted at the time interval of 5 seconds (T=5 s) from the movie image data, are printed on one sheet of the printing paper P1. Further, the twelve thumbnail images 30 are printed sequentially from the upper-left position to the lower-right position of the printing paper sheet P1 depending on the times of the original still image data as counted in the movie image data. The time interval of 5 seconds is merely an example, which is appropriately adjustable in conformity with the temporal length of the movie image data exactly as described above.

Further, the printing head 2 prints the movie image data ID 33 ("ABC": moving image identification mark) to identify the movie image data from which the still image data are extracted, at the upper-right position of the printing paper sheet P1. Further, the printing head 2 prints the time of the still image data corresponding to the thumbnail image 30 and a check box 34 at the position disposed just under each of the thumbnail images 30.

Further, as described later on, the printing head 2 prints a plurality of comparting lines 36 for comparting each of the thumbnail images 30 into a plurality of rectangular or oblong block areas 37 in order that the user easily instructs the correction position of the base image (in order that the user easily marks the correction position mark 32).

Figure 6:
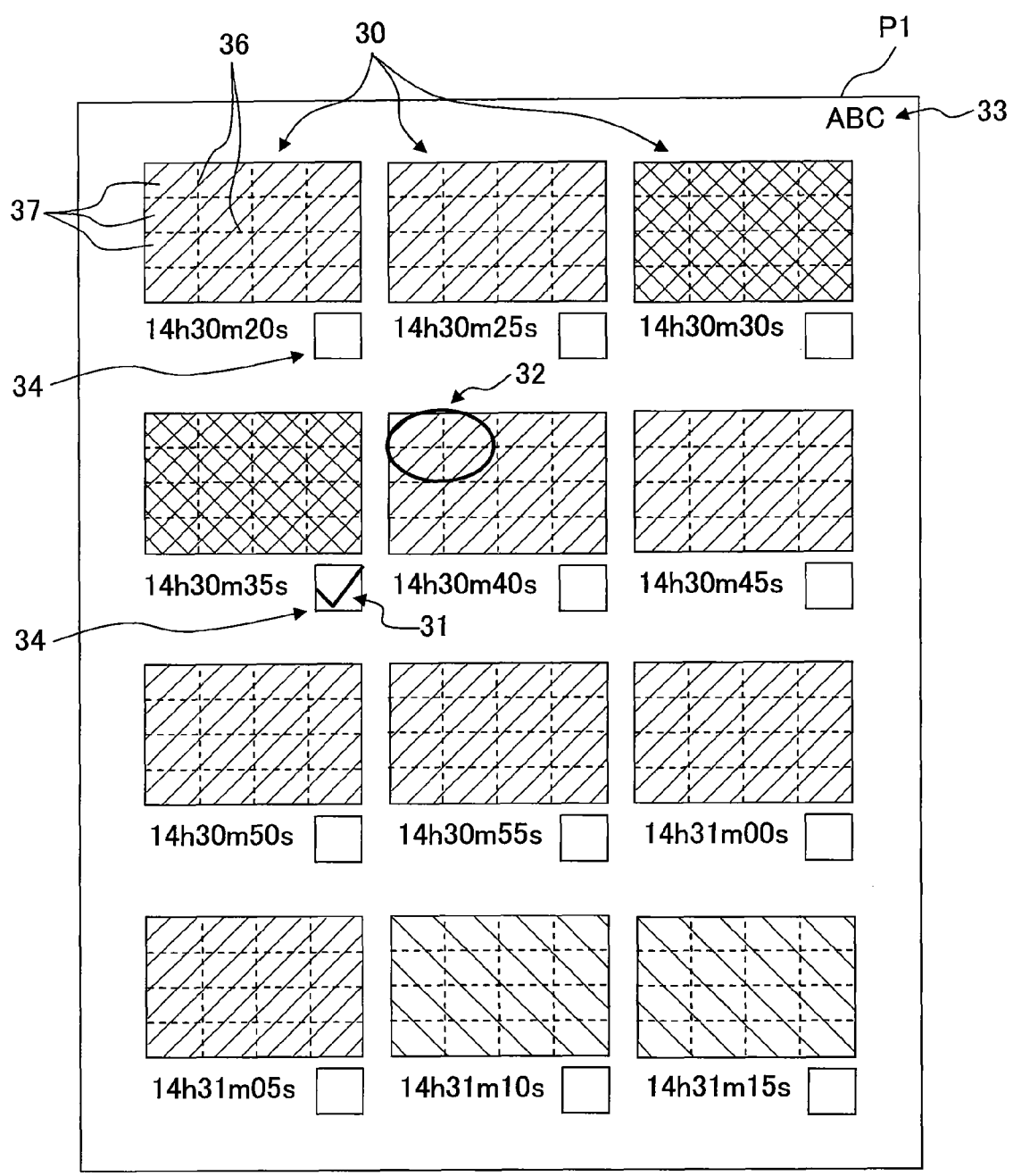
FIG. 6 shows a state in which a base image selection mark and a correction position mark are marked to the printing paper sheet on which the thumbnail images are printed.

After the thumbnail images 30 are printed on the printing paper sheet P1 as described above, the base image selection mark 31 is marked to the check box 34 of an arbitrary thumbnail image 30 (thumbnail image 30 corresponding to the still image data of 14 hours 30 minutes 35 seconds in FIG. 6), for example, by manually writing the base image selection mark 31 by the user with a pen or the like as shown in FIG. 6. Further, the correction position mark 32 is marked to an arbitrary block area or areas 37 (upper-left four block areas 37 in FIG. 6) so that a part of the thumbnail image 30 is surrounded on the thumbnail image 30 (14 hours 30 minutes 40 seconds in FIG. 6) which is distinct from the thumbnail image 30 marked with the mark 31.

Next, the combined image-printing process will be explained. With reference to FIG. 3 again, when the printing paper sheet P1, on which the thumbnail images 30 are printed, is read by the scanner 4 by performing the predetermined operation by the user (for example, the opening of the lid section 7, the setting of the printing paper sheet P1 on the placing stand, and the input of the reading start instruction) (S13: Yes), the image data-extracting section 25 detects the movie image data ID 33 printed at the upper-right position of the printing paper sheet P1, the base image selection mark 31, and the correction position mark 32, from the image data obtained by the scanner 4.

In this procedure, if the image-extracting section 25 fails in the detection of the base image selection mark 31, for example, such that the reading of the scanner 4 is performed without marking at least one of the base image selection mark 31 and the correction position mark 32 due to any mistake of the user or the checked marks 31, 32 cannot be read because they are thin (S14: No), the controller 5 displays, on the display 9, the error message which informs the user of the fact that the marks 31, 32 are not marked (S15).

In the first embodiment, as shown in FIG. 6, the base image selection mark 31 is marked to the check box 34, while the correction position mark 32 is marked on the thumbnail image 30. Therefore, the image data-extracting section 25 can distinguish and recognize the two types of the marks 31, 32 from the position information thereof. Further, as shown in FIG. 6, when the shapes of the two types of the marks 31, 32 are different from each other, the image data-extracting section 25 more hardly confuses the two types of the marks 31, 32.

When the image data-extracting section 25 detects both of the marks 31, 32 (S14: Yes), the image data-extracting section 25 recognizes the movie image data from which the still image data is to be extracted, from the obtained movie image data ID 33.

Subsequently, the base image-extracting section 26 of the image data-extracting section 25 recognizes the thumbnail image 30 corresponding to the check box 34 to which the base image selection mark 31 is marked. Further, the still image data (base image data), which corresponds to the thumbnail image 30, is extracted from the plurality of pieces of the still image data stored in correlation with the movie image data in the still image data storage section 24 (S16). In the case of the procedure shown in FIG. 6, the still image data at 14 hours 30 minutes 35 seconds is extracted as the base image data.

The correction data-extracting section 27 of the image data-extracting section 25 recognizes the thumbnail image 30 to which the correction position mark 32 is marked. Further, the still image data (correction image data) for correcting the base image data, which corresponds to the thumbnail image 30, is extracted from the plurality of pieces of the still image data stored in correlation with the movie image data in the still image data storage section 24 (S17). In the case of the procedure shown in FIG. 6, the still image data at 14 hours 30 minutes 40 seconds, which is disposed just after (after 5 seconds) the base image data, is extracted as the correction image data.

The correction data-extracting section 27 cuts out or slices out, as the correction data from the correction image data, the data which corresponds to the part of the thumbnail image 30 marked with the correction position mark 32 and surrounded by the correction position mark 32 (S18). In the case of the procedure shown in FIG. 6, the data, which corresponds to the inner area of the elliptical correction position mark 32 marked to the upper-left portion of the thumbnail image 30, is extracted from the correction image data corresponding to the thumbnail image 30.

Subsequently, the image-combining section 28 combines the base image data extracted by the base image data-extracting section 26 with the correction data extracted by the correction data-extracting section 27 to generate the combined image data (S19). That is, the data, which is included in the base image data and which corresponds the area surrounded by the correction position mark 32, is replaced with the correction data cut out from the correction image data as the distinct still image data which is different from the base image data.

Figure 7:
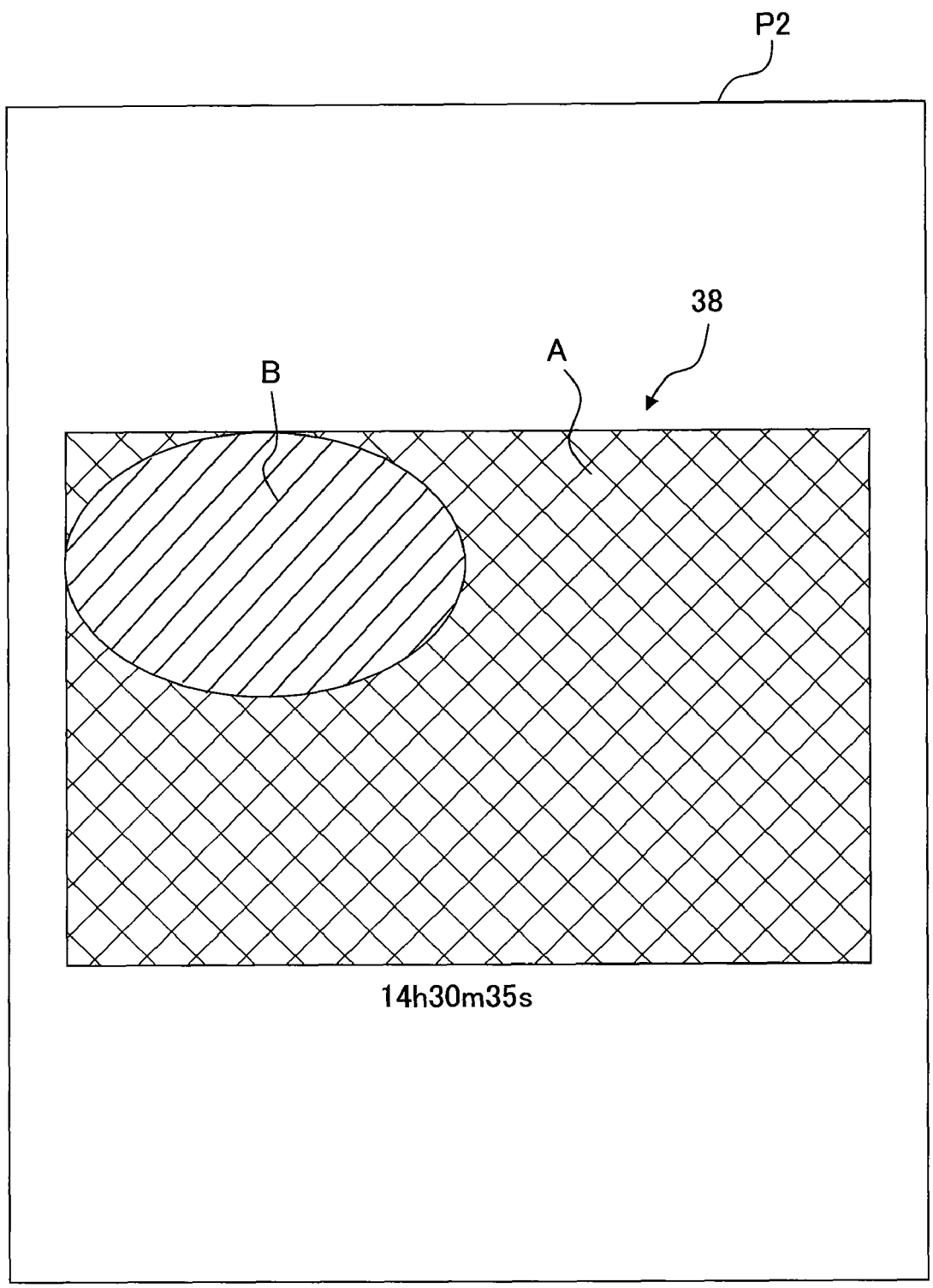
FIG. 7 shows a state in which a combined image is printed on a printing paper sheet.

As described above, when the combined image data is generated by the image-combining section 28, as shown in FIG. 7, the printing head 2, which is controlled by the printing control section 20, prints the image 38 of the combined image data together with the time (14 hours 30 minutes 35 seconds) of the base image data on the printing paper sheet P2 (second printing medium) which is distinct from the printing paper sheet P1 on which the thumbnail images 30 are printed (S20). With reference to FIG. 7, the image of the area A, which is included in the image 38 printed on the printing paper sheet P2, is the image of the base image data (i.e., the still image data at the point of time of 14 hours 30 minutes 35 seconds). However, the image of the area B is the image of the correction data cut out from the correction image data (still image data at the point of time of 14 hours 30 minutes 40 seconds later than the base image data by 5 seconds).

According to the multifunction printer 1 of the first embodiment described above, the following effect is obtained. That is, even when any defective portion (unfavorite portion for the user) is present in a part of the base image as the image which is intended to be printed by the user, the defective portion can be replaced with the correction data extracted from the correction image data distinct from the base image data. Therefore, it is possible to print the satisfactory image in which no defective portion is present.

The user views the list indication of the thumbnail images 30 of the plurality of pieces of the still image data printed on the printing paper sheet P1, and the user marks the base image selection mark 31 and the correction position mark 32 on the printing paper sheet P1. After that, the combined image 38, in which a part of the base image is corrected, is automatically printed on the distinct printing paper sheet P2 by only allowing the scanner 4 to read the printing paper sheet P1. Therefore, it is unnecessary for the user to perform any special operation which is not performed during the ordinary image printing in order to print the combined image. Therefore, even when the user is weak in the instrument operation, the user can easily print the combined still image of the desired scene contained in the moving image.

The correction data-extracting section 27 extracts, as the correction image data, the still image data corresponding to the thumbnail image 30 marked with the correction position mark 32. Therefore, the user can simultaneously perform the designation of the correction position and the correction image data by merely marking the correction position mark 32 directly to any arbitrary thumbnail image 30.

The correction data-extracting section 27 extracts, as the correction data from the correction image data, the data corresponding to the area marked with the correction position mark 32, of the thumbnail image 30. Therefore, the user can easily designate the correction position by directly marking the correction position mark 32 to the area on the thumbnail image 30 in which the base image is intended to be corrected. Further, the correction data-extracting section 27 cuts out, as the correction data, the data corresponding to the area surrounded by the correction position mark 32. Therefore, the user can instruct the correction area more finely by surrounding only the area intended to be corrected with the correction position mark 32. In other words, it is possible to avoid an inconvenience which would be otherwise caused such that the area of the base image, which is not required to be corrected, may be replaced with the correction image data in contravention of the intention of the user.

Further, the printing head 2 simultaneously prints the movie image data ID 33 (moving image identification mark) when the thumbnail images 30 are printed on the printing paper sheet P1. Therefore, when the printing paper sheet P1, which is marked with the base image selection mark 31 and the correction position mark 32, is read by the scanner 4, the image data-extracting section 25 can recognize the movie image data from which the base image data and the correction image data are to be printed, from the movie image data ID 33 printed on the printing paper sheet P1. In other words, it is unnecessary that the multifunction printer 1 should inquire of the user about from which movie image data the base image data and the correction image data are to be extracted.

However, if the multifunction printer 1 can recognize from which movie image data the still image data (base image data and correction image data) is to be extracted, by any other method, it is not necessarily indispensable that the printing head 2 prints the movie image data ID 33 (moving image identification mark) together with the thumbnail images 30 on the printing paper sheet P1. For example, when the printing paper sheet P1 marked with the base image selection mark 31 and the correction position mark 32 is read by the scanner 4, then a list of file names of the movie image data may be displayed on the display 9, and the user may select the movie image data from which the still image data is to be extracted. Alternatively, when the printing paper sheet P1 marked with the marks 31, 32 is read by the scanner 4, then the movie image data, which is directed to the thumbnail image printing just previously, can be also regarded as the movie image data from which the base image data and the correction image data corresponding to the marks 31, 32 are to be extracted.

A first modified embodiment will be explained, in which the following modification is applied to the first embodiment explained above. In the first embodiment described above, the printing head 2 simultaneously prints the plurality of check boxes 34 corresponding to the plurality of thumbnail images 30 respectively in order that the user easily marks the base image selection mark 31, when the plurality of thumbnail images 30 are printed on the printing paper sheet P1 (see FIGS. 6 and 7). However, it is possible to recognize the thumbnail image 30 selected by the mark 31 from the position at which the base image selection mark 31 is marked, irrelevant to the presence or absence of the check boxes 34. Therefore, it is not necessarily indispensable that the printing head 2 should print the check boxes 34 together with the plurality of thumbnail images 30.

When the check box 34 is not printed on the printing paper sheet P1 as described above, then the user may directly write the mark 31 on any arbitrary thumbnail image 30, or the user may mark the mark 31 at any position disposed around the thumbnail images 30. However, when the check boxes 34 are not printed, it is difficult to distinguish the base image selection mark 31 and the correction position mark 32 based on only the position information thereof. Accordingly, it is preferable that the two types of the marks 31, 32 are marked in different shapes so that the image data-extracting section 25 does not confuse the base image selection mark 31 and the correction position mark 32.

Next, a second modified embodiment will be explained. The number of pieces of the still image data extracted from one piece of the movie image data is large depending on the total time of the movie image data and/or the time interval at which the still image data are extracted. All of the thumbnail images 30, which correspond to the pieces of the still image data, cannot be printed on one printing paper sheet P in some cases. In such a situation, the thumbnail images 30 of one piece of the movie image data are printed over a plurality of printing paper sheets P1.

In this case, at first, the still image data-extracting section 22 extracts, from the movie image data, the plurality of pieces of the still image data while dividing them into a plurality of groups. The printing control section 20 judges on which printing paper sheet P1 the thumbnail image 30 of a certain piece of the still image data is to be printed, from the group to which the still image data belongs. The printing head 2 is controlled on the basis thereof. In other words, the thumbnail images 30 of the plurality of pieces of the still image data belonging to a certain group are printed by the printing head 2 on one printing paper sheet P1.

Figure 8:
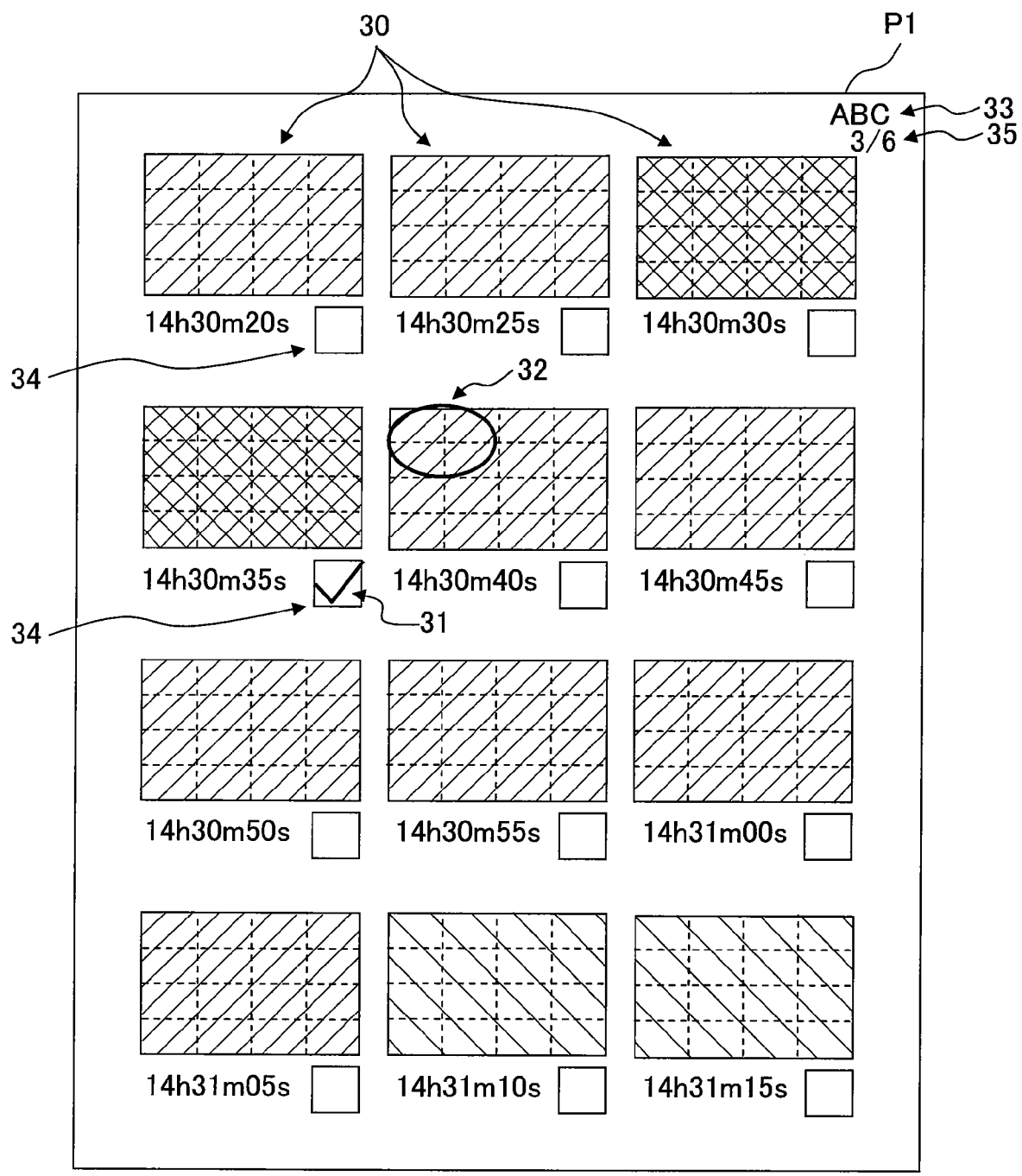
FIG. 8 shows a state in which a base image selection mark and a correction position mark are marked to a printing paper sheet in a modified embodiment of the first embodiment.

In this procedure, as shown in FIG. 8, the printing head 2 preferably prints the thumbnail images 30 of the pieces of the still image data belonging to each of the groups on one printing paper sheet P1. Further, the group identification mark 35, which corresponds to the group, is preferably printed on the same printing paper sheet P1. The group identification mark 35 of "⅜" shown in FIG. 8 indicates the third printing paper sheet P1 of the six printing paper sheets P1 in total on which the thumbnail images 30 are printed.

In this case, when the base image selection mark 31 and the correction position mark 32 are marked to any one of the plurality of printing paper sheets P1 on which the thumbnail images 30 are printed, and then the printing paper sheet P1 is read by the scanner 4, then the image data-extracting section 25 can recognize the positions at which the marks 31, 32 are marked, from the image data obtained by the scanner 4, and the image data-extracting section 25 can recognize the group from which the base image data and the correction image data are to be extracted, from the group identification mark 35. Therefore, it is unnecessary for the multifunction printer 1 to inquire of the user from which group the base image data and the correction image data are to be extracted.

If the multifunction printer 1 can recognize the group from which the base image data and the correction image data are to be extracted, by any other method, it is unnecessary for the printing head 2 to print the group identification mark 35 together with the thumbnail images 30 on the printing paper sheet P1. For example, the following procedure is also available. That is, when the printing paper sheet P1, to which the marks 31, 32 are marked, is read by the scanner 4, then a message may be displayed on the display 9, and the user may input, from the operating section 8, which printing paper sheet P is read by the scanner 4.

Figure 9:
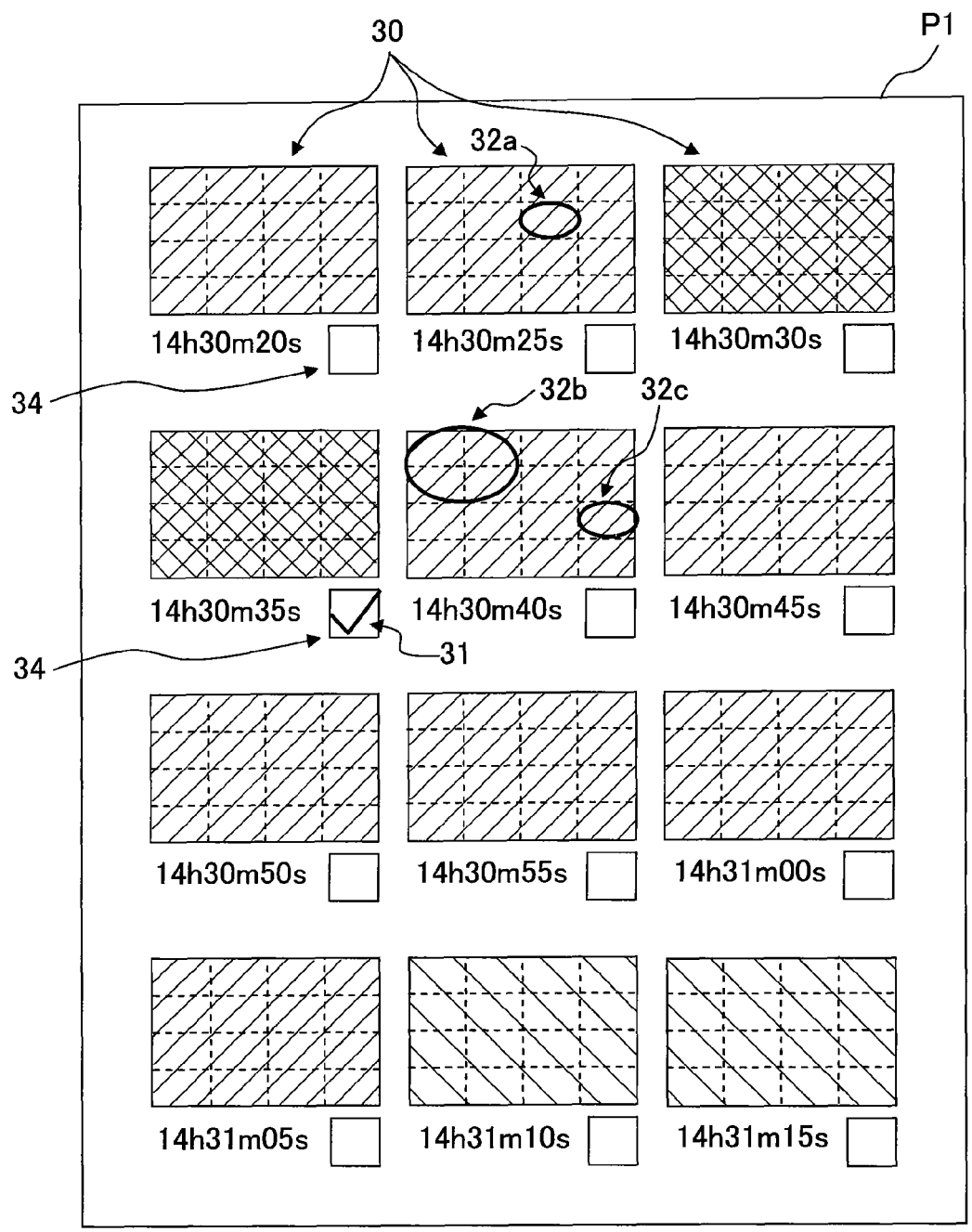
FIG. 9 shows a state in which a base image selection mark and correction position marks are marked to a printing paper sheet in another modified embodiment of the first embodiment.

Next, a third modified embodiment will be explained. A plurality of correction position marks 32 may be marked by the user to the printing paper sheet P1 on which a plurality of thumbnail images 30 are printed. For example, in FIG. 9, a base image selection mark 31 is marked to a thumbnail image 30 at the point of time of 14 hours 30 minutes 35 seconds of twelve thumbnail images 30 printed on the printing paper sheet P1. Further, one correction position mark 32a is marked to a thumbnail image 30 at the point of time 10 seconds before the thumbnail image 30 to which the base image selection mark 31 is marked. Further, two correction position marks 32b, 32c are marked to a thumbnail image 30 at the point of time after 5 seconds.

In this situation, the base image-extracting section 26 extracts, as the base image data, the still image data at the point of time of 14 hours 30 minutes 35 seconds corresponding to the base image selection mark 31. On the other hand, the correction data-extracting section 27 extracts the still image data 10 seconds before the base image data and the still image data 5 seconds thereafter as the correction image data respectively. Further, the correction data-extracting section 27 extracts, as the correction data, the data corresponding to the mark 32a marked to the thumbnail image 30 which is 10 seconds before and the data corresponding to the marks 32b, 32c marked to the thumbnail image which is 5 seconds after respectively.

Figure 10:
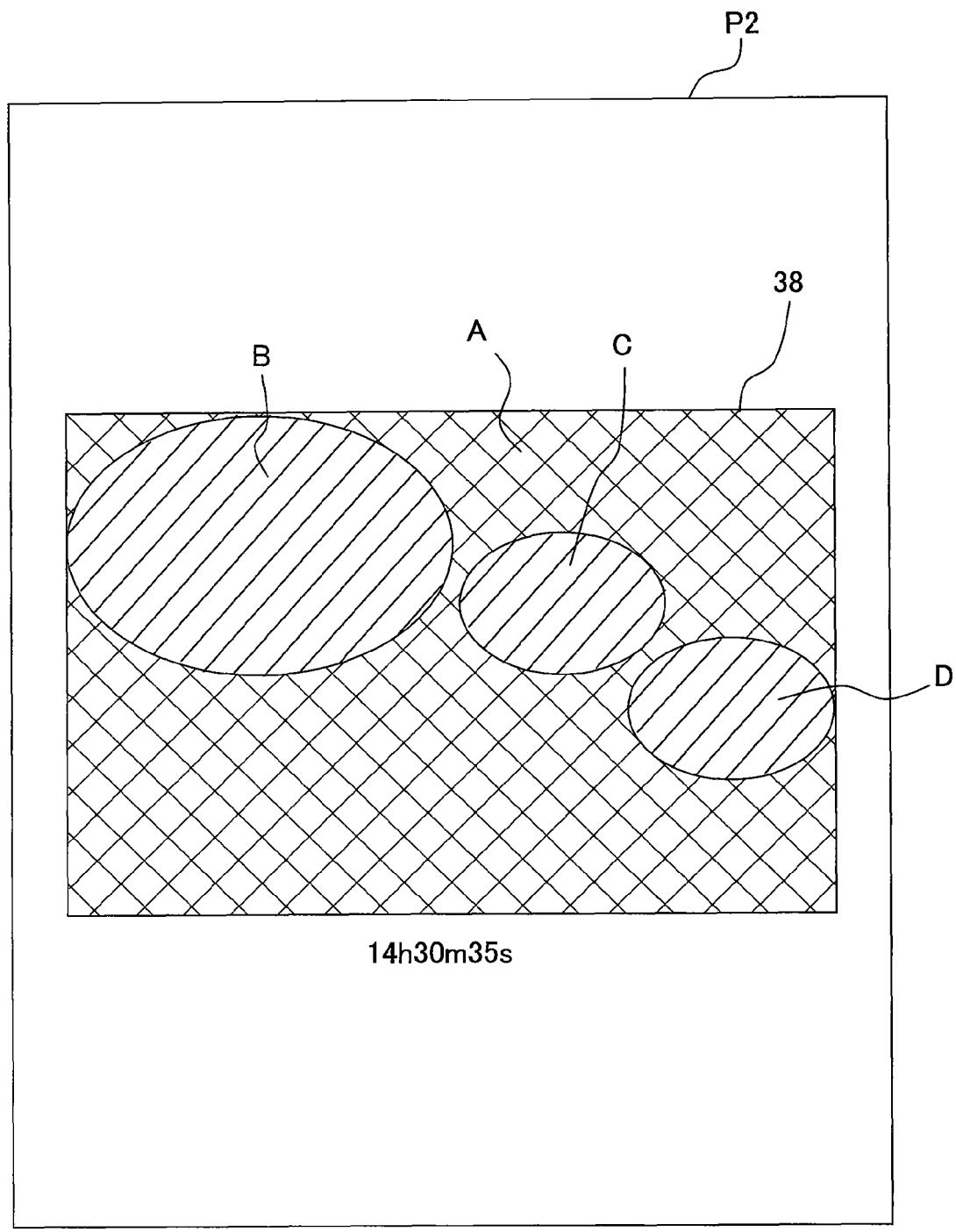
FIG. 10 shows a state in which a combined image is printed on a printing paper sheet corresponding to FIG. 9.

The image-combining section 28 combines one piece of the base image data and three pieces of the correction data to generate the combined image data. As shown in FIG. 10, the printing head 2 prints the image of the combined image data on the printing paper sheet P2. In FIG. 10, the image of the area A, which is included in the combined image 38 printed on the printing paper sheet P2, is the image of the base image data (still image data at the point of time of 14 hours 30 minutes 35 seconds). However, the image of the area C is the image of the correction data cut out from the correction image data (still image data at the point of time of 14 hours 30 minutes 25 seconds) earlier than the base image data by 10 seconds. Further, the images of the areas B, D are the images of the two pieces of the correction data cut out from the correction image data (still image data at the point of time of 14 hours 30 minutes 40 seconds) later than the base image data by 5 seconds respectively.

Next, a fourth embodiment will be explained. In the first embodiment described above, the data, which corresponds to the area surrounded by the correction position mark 32 directly marked onto the thumbnail image 30, is cut out by the correction data-extracting section 27 as the correction data from the correction image data (see FIG. 7). However, it is also possible to adopt another correction data-extracting technique on condition that the correction position mark 32 marked by the user corresponds to the area for which the correction data is cut out from the correction image data.

Figure 11A:
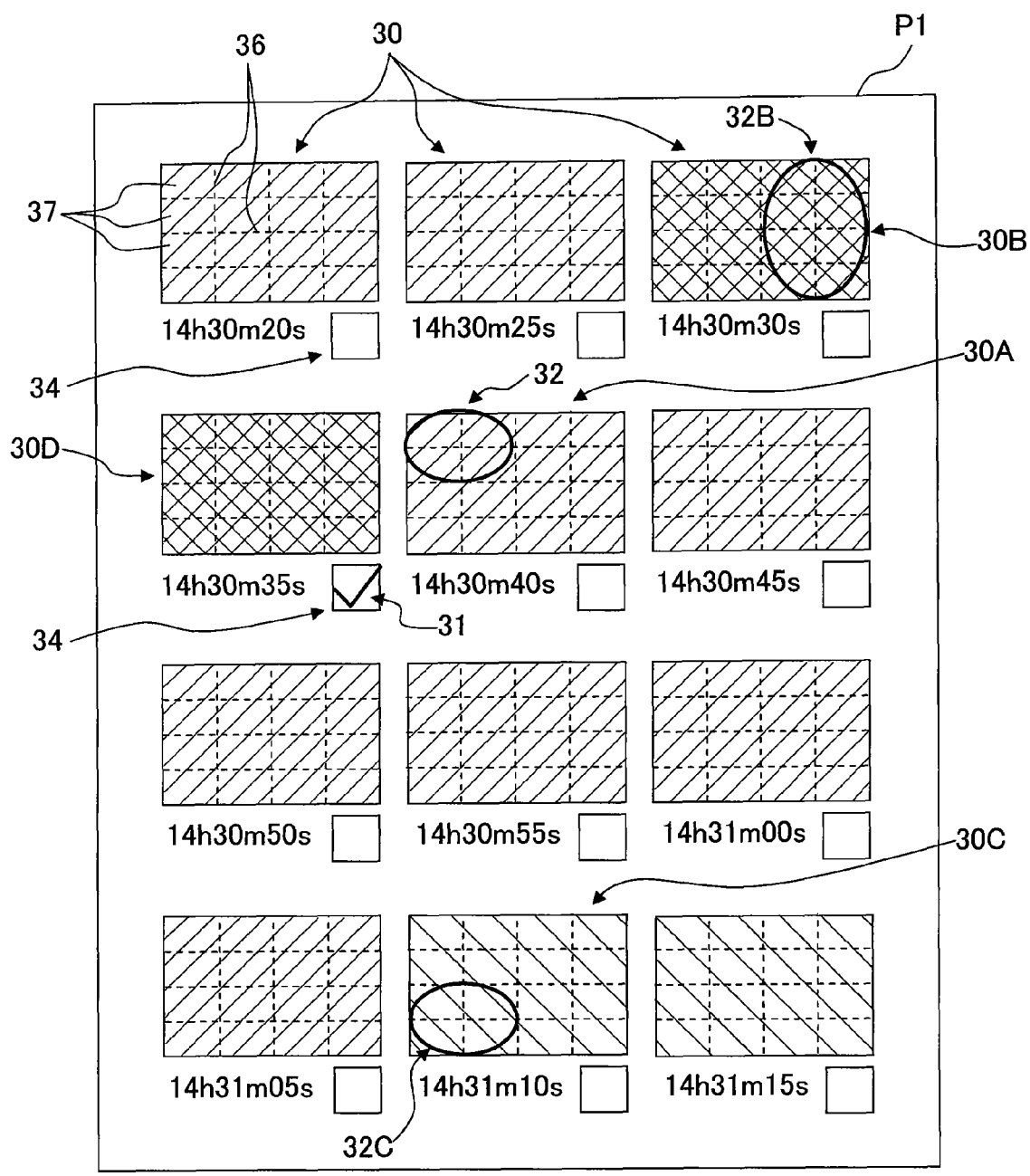
FIGS. 11A to 11C show states in which combined images are printed on printing paper sheets in still another modified embodiment of the first embodiment.
Figure 11B:
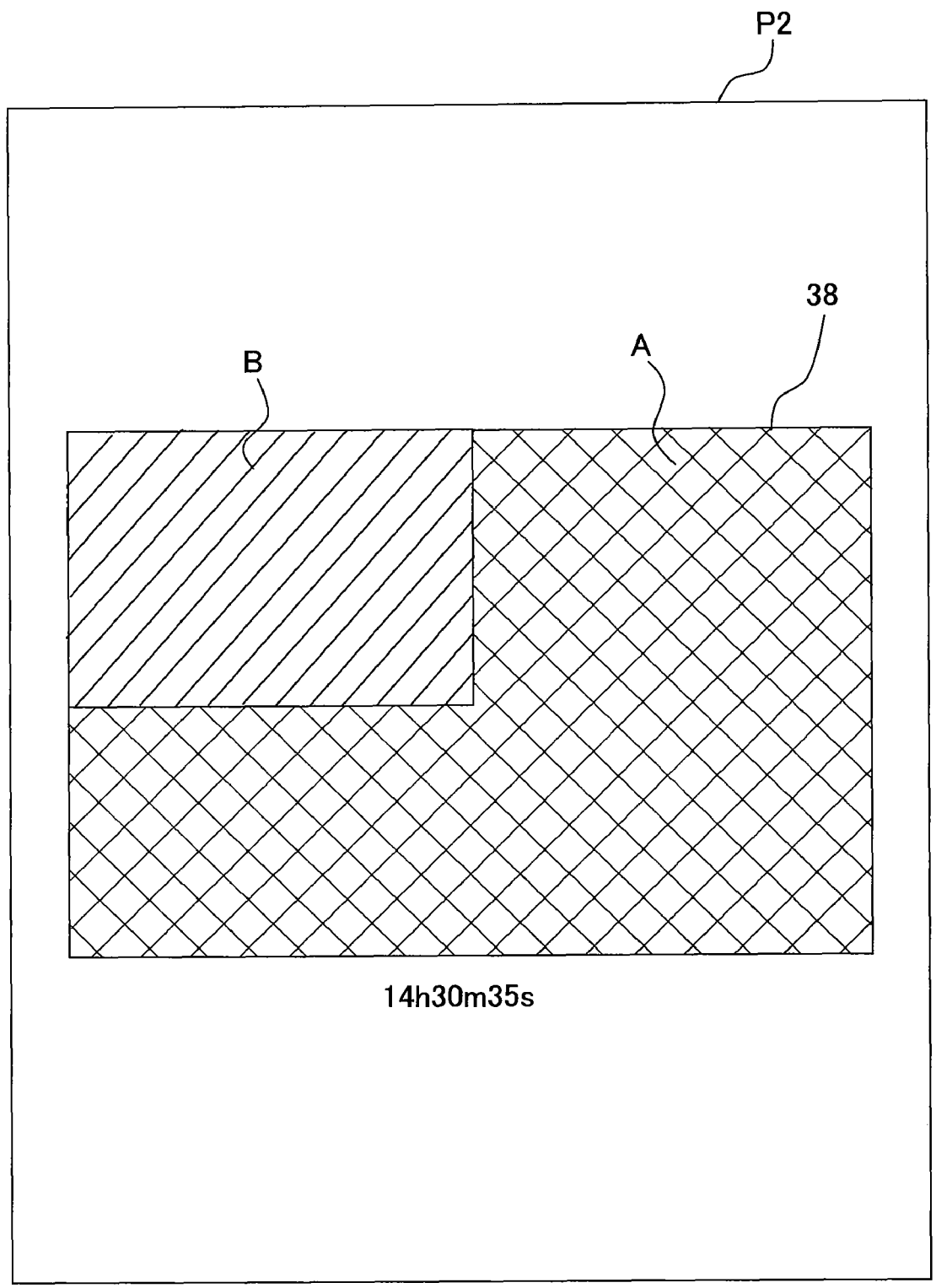

For example, as shown in FIG. 11A, when each of the thumbnail images 30 printed on the printing paper sheet P1 is comparted into the plurality of block areas 37 by the comparting lines 36 (see FIG. 5), if the correction position mark 32 is marked to a partial area of a certain thumbnail image 30A, then the correction data-extracting section 27 may cut out, as the correction data, the entire data of the block areas 37 including the correction position mark 32 (upper-left four areas of the thumbnail image 30A marked with the correction position mark 32 in FIG. 11A). When the base image data and the correction data are combined with each other, and the combined image 38 is printed on the printing paper sheet P2 as shown in FIG. 11B, then the area A of the combined image 38 is the image of the base image data, and the block area B, which is disposed at the upper-left portion of the combined image 38 corresponding to the correction position mark 32, is the image of the correction data cut out from the correction image data. In this case, it is enough that the correction position mark 32 is marked in the block area 37 to instruct one or a plurality of desired block area or areas 37. Therefore, any shape of the correction position mark 32 is available. In other words, it is not necessarily indispensable that the correction position mark 32 is formed to have the shape to surround the partial area of the thumbnail image 30 as in the first embodiment described above.

Further, it is also not necessarily indispensable that the correction position mark 32 is directly marked onto the thumbnail image 30. For example, the printing head 2 may print a plurality of check columns for the area selection correlated with the areas in the thumbnail images 30 around the respective thumbnail images 30. The correction area of the base image may be designated by marking the correction position marks 32 to the plurality of check columns for the area selection.

In the fourth modified embodiment, it is premised that the base image is selected by marking the base image selection mark 31 to a certain thumbnail image 30D by the user as shown in FIG. 11A. However, it is not necessarily indispensable that the base image selection mark 31 is marked on condition that a plurality of block areas 37 are instructed without any excess and any deficiency so that one sheet of the combined image is established upon the image combination.

Figure 11C:
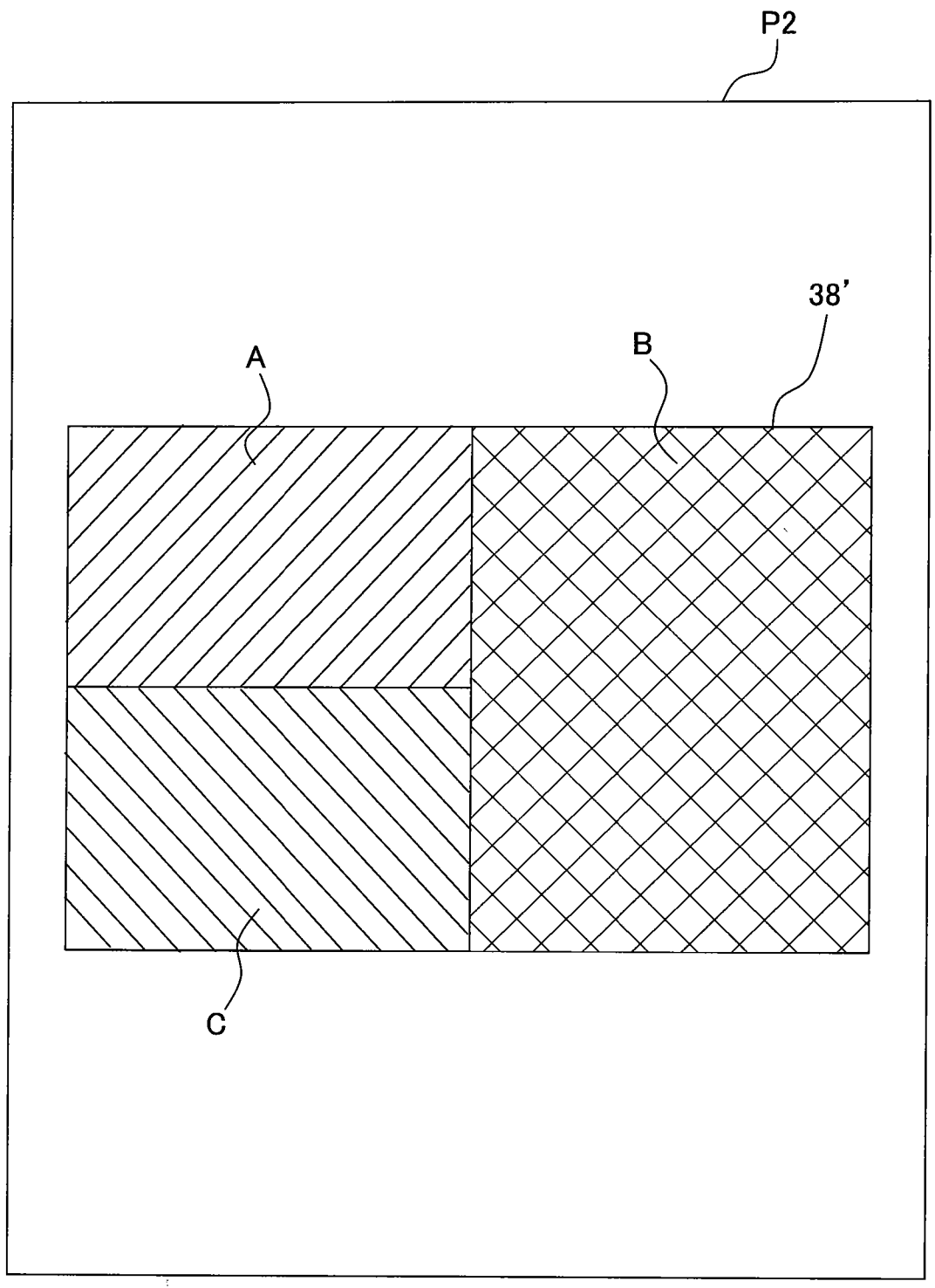

For example, as shown in FIG. 11A, when the correction position mark 32 is marked to the upper-left four block areas of the thumbnail image 30A as the area for forming the upper-left portion of the combined image, the correction position mark 32B is marked to the eight right block areas of the thumbnail image 30B as the area for forming the right portion of the combined image, and the correction position mark 32C is marked to the lower-left four block areas of the thumbnail image 30C as the area for forming the lower-left portion of the combined image, then it is unnecessary to mark the base image selection mark 31. In this case, a combined image 38' as shown in FIG. 11C is printed on the printing paper sheet P2. That is, the upper-left area A of the combined image 38' is the image of the correction data corresponding to the four upper-left block areas cut out from the thumbnail image 30A. Similarly, the right area B of the combined image 38' is the image of the correction data corresponding to the eight right block areas cut out from the thumbnail image 30B. The lower-left area C is the image of the correction data corresponding to the four lower-left block areas cut out from the thumbnail image 30C.

In this case, it is possible to omit the base image-extracting step (S16) to be performed by the base image-extracting section 26 in the combined image-printing process in the first embodiment. Further, in the step of detecting the mark (S14), Step S17 may be executed when the image data-extracting section 25 detects the fact that the plurality of block areas 37 are marked without any excess and any deficiency so that one sheet of the combined image is established (S14: Yes). Other than the above (S14: No), Step S15 may be executed.

Figure 12:
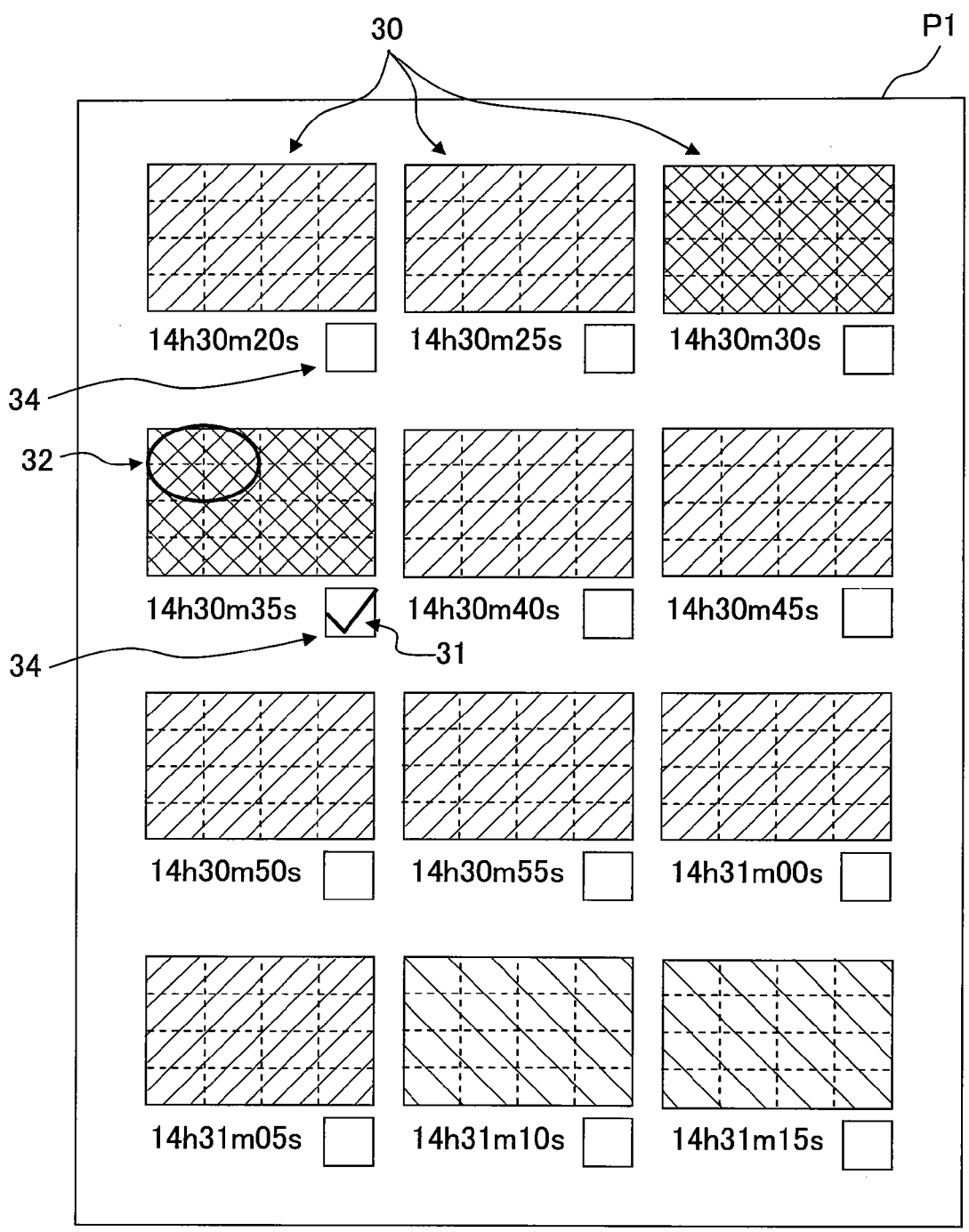
FIG. 12 shows a state in which a base image selection mark and a correction position mark are marked to a printing paper sheet in still another modified embodiment of the first embodiment.

Next, a fifth modified embodiment will be explained. In the first embodiment described above, the thumbnail image 30, to which the base image selection mark 31 is marked by the user, is different from the thumbnail images 30 to which the correction position mark 32 is marked. However, as shown in FIG. 12, the base image selection mark 31 and the correction position mark 32 may be marked to the same thumbnail image 30.

In this case, the correction data-extracting section 27 judges that the correction position mark 32 merely indicates the position of the area to be corrected in the base image. Therefore, the correction data-extracting section 27 extracts, as the correction image data, the still image data which is distinct from the still image data corresponding to the thumbnail image 30 marked with the base image selection mark 31 and the correction position mark 32. The data, which corresponds to the correction position mark 32 of the correction image data, is cut out as the correction data.

However, in this form, the correction image data to be selected is not instructed by the correction position mark 32 unlike the first embodiment described above. Therefore, it is necessary to select the correction image data by any other technique. Accordingly, for example, the correction data-extracting section 27 may automatically adopt the still image data temporally positioned before and/or after the base image data, as the correction image data to be used for the correction of the base image. That is, as shown in FIG. 12, when the still image data at the point of time of 14 hours 30 minutes 35 seconds is extracted as the base image data, it is also allowable to automatically extract, as the correction image data, the still image data at 14 hours 30 minutes 30 seconds earlier then the foregoing point of time by the still image extraction time interval T (T=5 s) and/or the still image data at 14 hours 30 minutes 40 seconds later by the time interval T.

Alternatively, when any correction image selection mark, which is distinct from the correction position mark 32, is marked to any arbitrary thumbnail image 30 on the printing paper sheet P2, the still image data, which corresponds to the thumbnail image 30 marked with the correction image selection mark, may be adopted as the correction image data.

Figure 13:
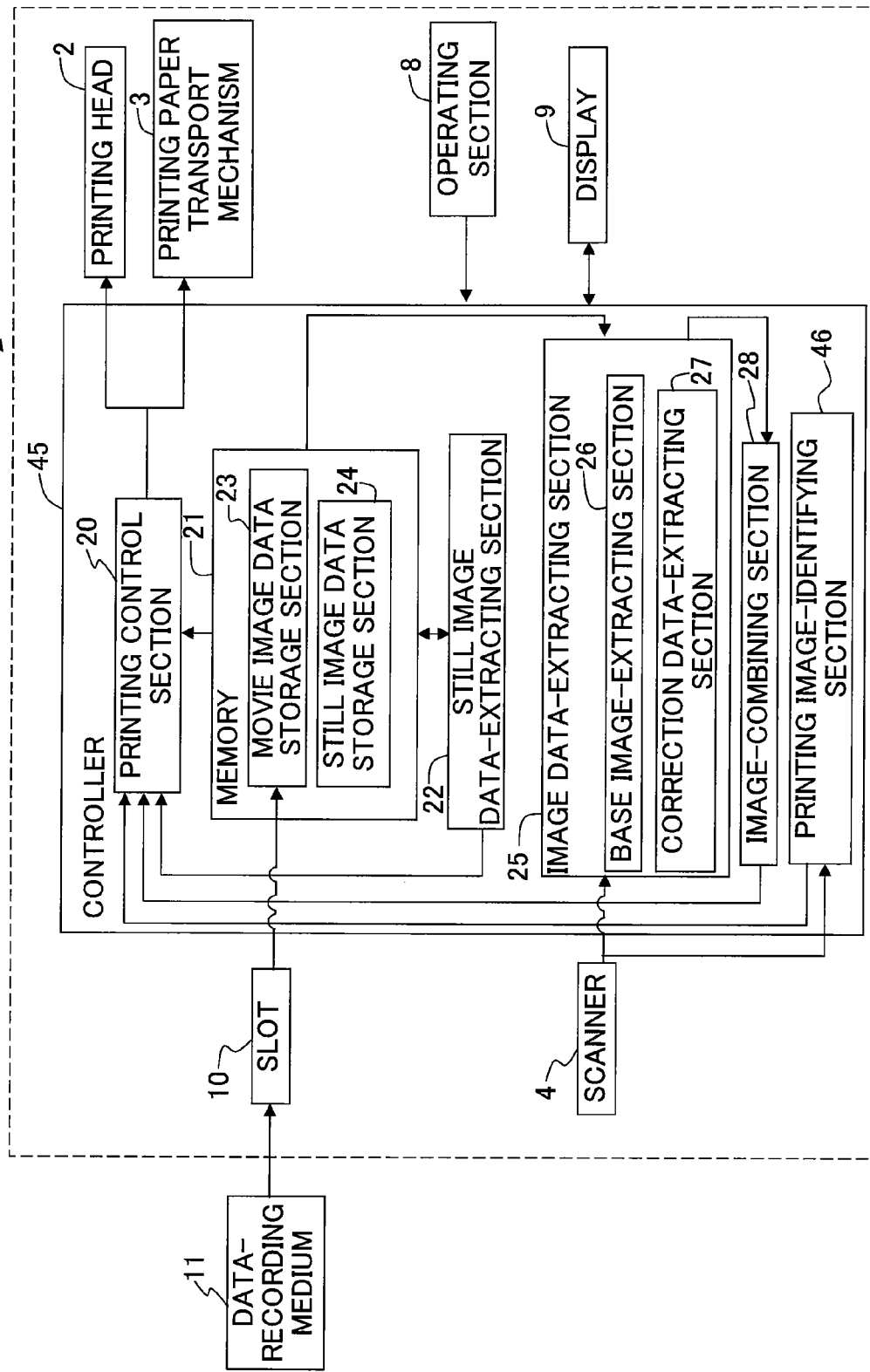
FIG. 13 shows a block diagram schematically illustrating an electric configuration of a multifunction printer according to a second embodiment.
Figure 14:
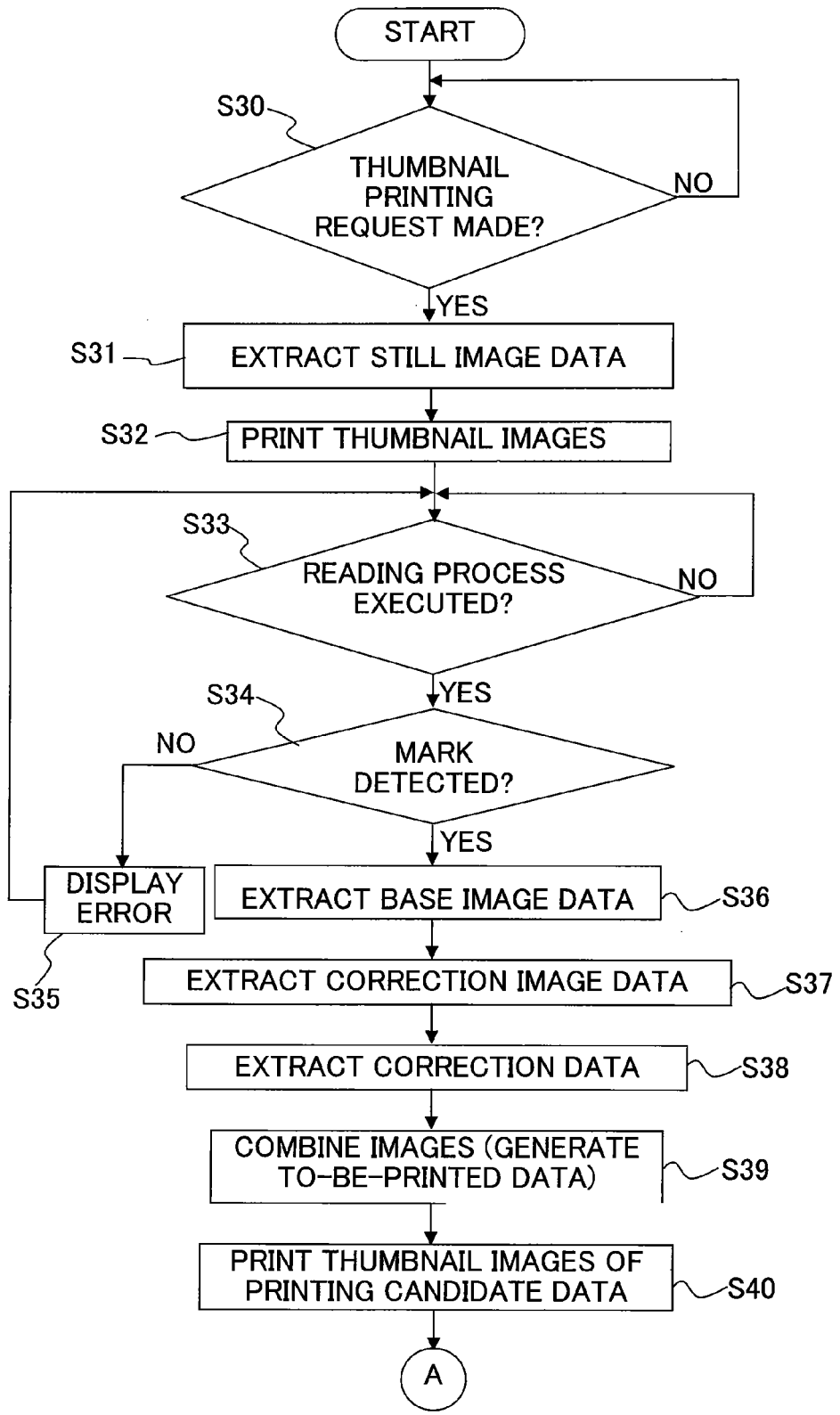
FIG. 14 shows a flow chart illustrating the former half of the still image-printing process.
Figure 15:
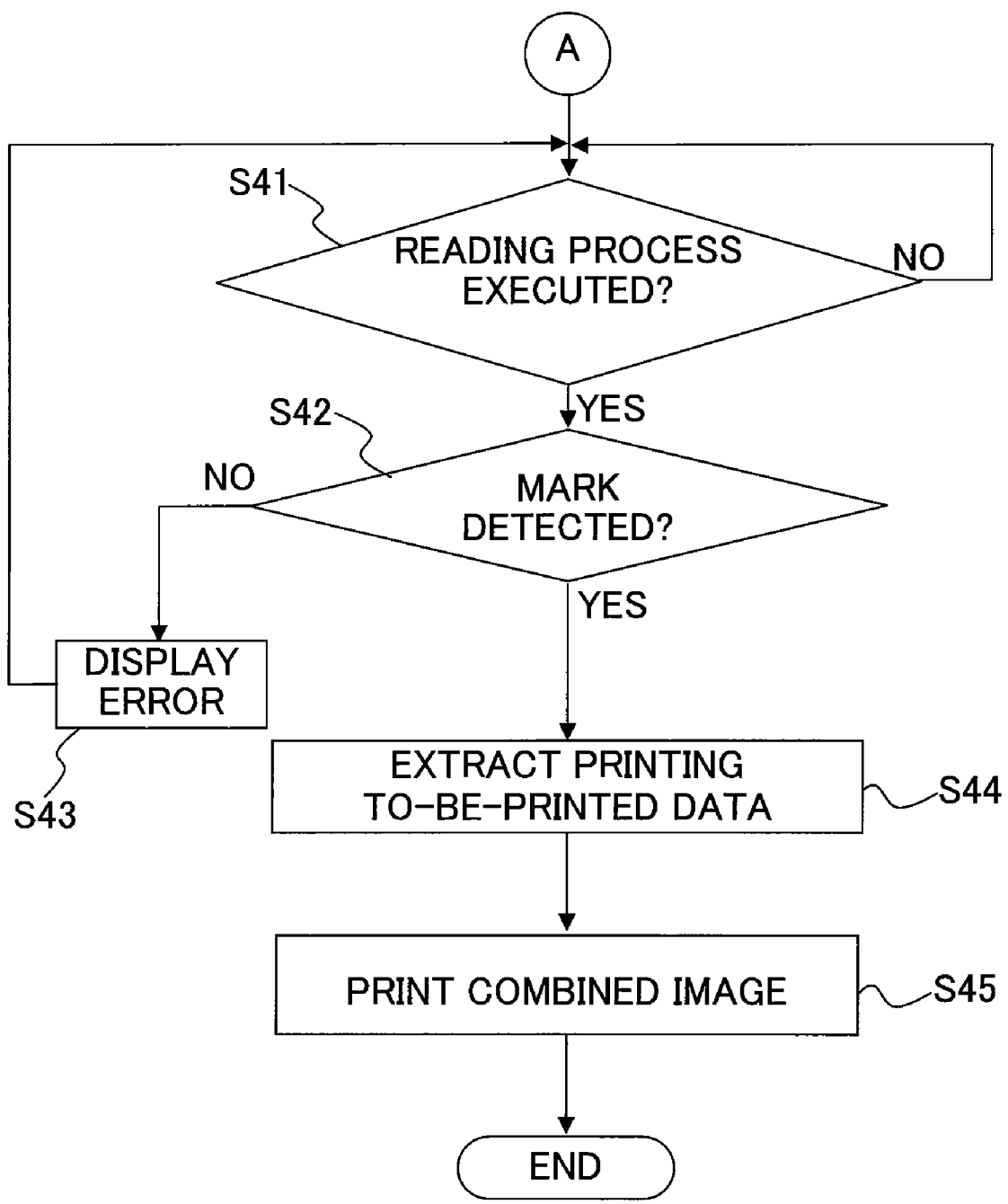
FIG. 15 shows a flow chart illustrating the latter half of the still image-printing process.

Next, a second embodiment of the present invention will be explained. FIG. 13 shows a block diagram schematically illustrating an electric configuration of a multifunction printer 41 according to the second embodiment.

The multifunction printer 41 of the second embodiment is approximately the same as that of the first embodiment described above in relation to such a basic arrangement that the thumbnail images 30 of the still image data extracted from the movie image data are shown in a list on a printing paper sheet P1, and then the combined image 38 obtained by combining the base image and a part of the correction image selected by the user is printed on another printing paper sheet P2. Accordingly, in the following description, those constructed differently from those in the first embodiment will be principally explained. The components or parts, which are the same as or equivalent to those of the first embodiment described above, will be appropriately omitted from the explanation.

When the user marks the base image selection mark 31 and the correction position mark 32 to the thumbnail image 30 printed on the printing paper sheet P1, and the combined image, which is obtained by combining the base image and the correction data, is printed on the printing paper sheet P2, then it is sometimes considered that any other combined image is intended to be printed, because the combined image is slightly different from one expected by the user. However, in such a situation, it is laborious for the user to select the base image, the correction image, and the correction position of the base image.

In view of the above, in the multifunction printer 41 of the second embodiment, two or more pieces of the correction image data are extracted, and pieces of the correction data are cut out from the pieces of the correction image data. Further, the base image data is combined with the two or more of the correction data cut out from the correction image data respectively to generate two or more pieces of the to-be-printed data, and thumbnail images 60 of the to-be-printed data are printed on another printing paper sheet P3 (third printing medium) (see FIG. 17). In other words, the user can select one printing image which is believed as the best, from the plurality of combined images as the to-be-printeds.

Figure 17:
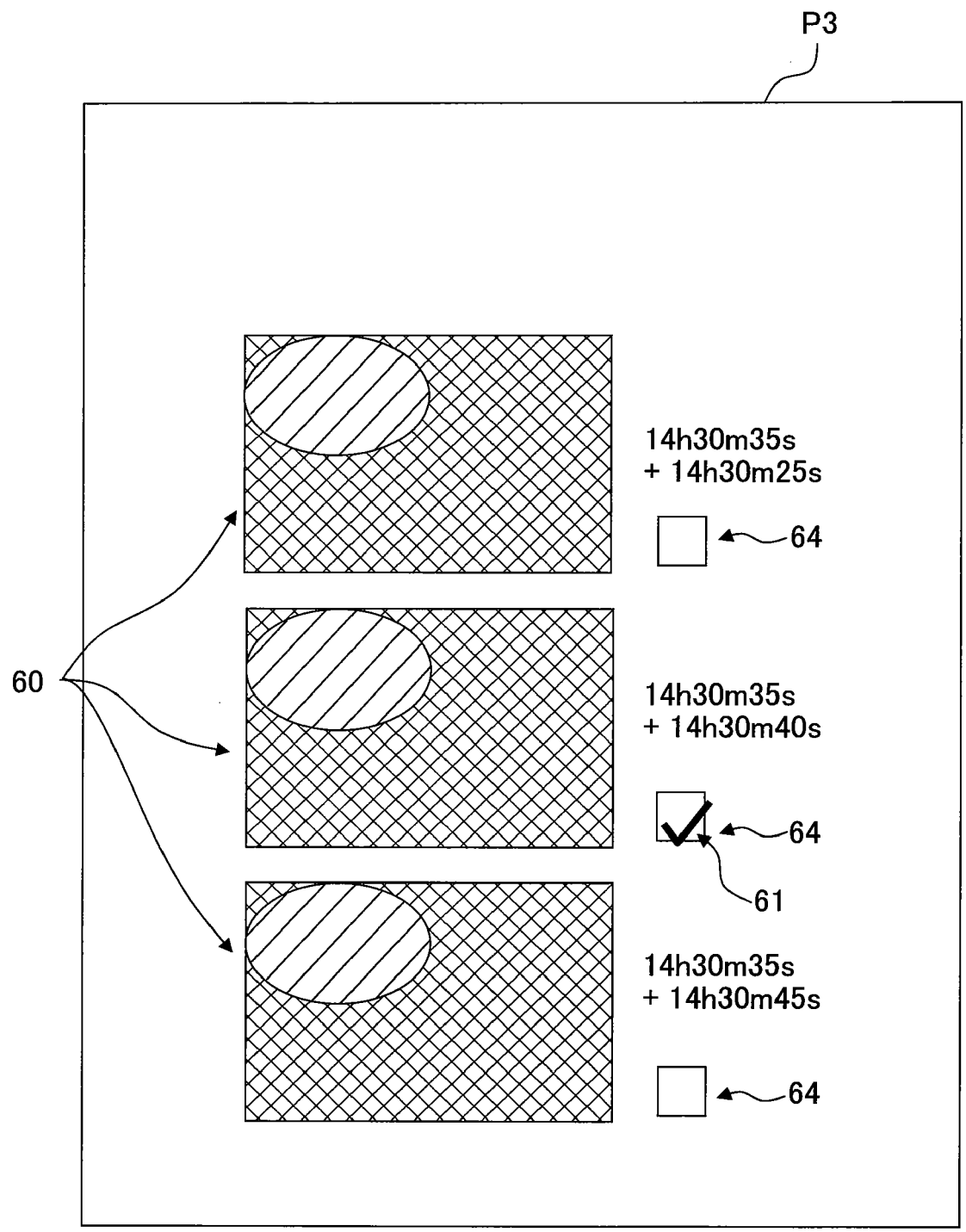
FIG. 17 shows a state in which a printing selection mark is marked to a printing paper sheet on which three to-be-printed thumbnail images are printed.

The printing paper sheet P3 is read by the scanner 4 in a state in which a predetermined printing selection mark 61 is marked by the user to an arbitrary thumbnail image 60 of the to-be-printed data (see FIG. 17). As shown in FIG. 13, the controller 45 of the multifunction printer 41 of the second embodiment further comprises a printing image-identifying section 46. The to-be-printed data, which corresponds to the printing selection mark 61 marked to the printing paper sheet P3, is identified or distinguished by the printing image-identifying section 46. The printing head 2 prints, on the printing paper sheet P2, the image 38 of the to-be-printed data identified by the printing image-identifying section 46.

An explanation will be made more specifically with reference to flow charts shown in FIGS. 14 and 15 and FIGS. 16 to 18 about a series of the still image-printing process including the thumbnail image printing and the combined image printing in the second embodiment.

When the instruction, which requires the thumbnail image printing for the predetermined movie image data, is inputted from the operating section 8 by the user (S30: Yes), then the still image data-extracting section 22 extracts a plurality of pieces of the still image data from the movie image data (S31), and the printing head 2 prints, on the printing paper sheet P1, a plurality of thumbnail images 30 corresponding to the plurality of the still image data respectively (S32). The printing head 2 also prints, on the printing paper sheet P1, a plurality of check boxes 34 corresponding to the plurality of thumbnail images 30 respectively.

Figure 16:
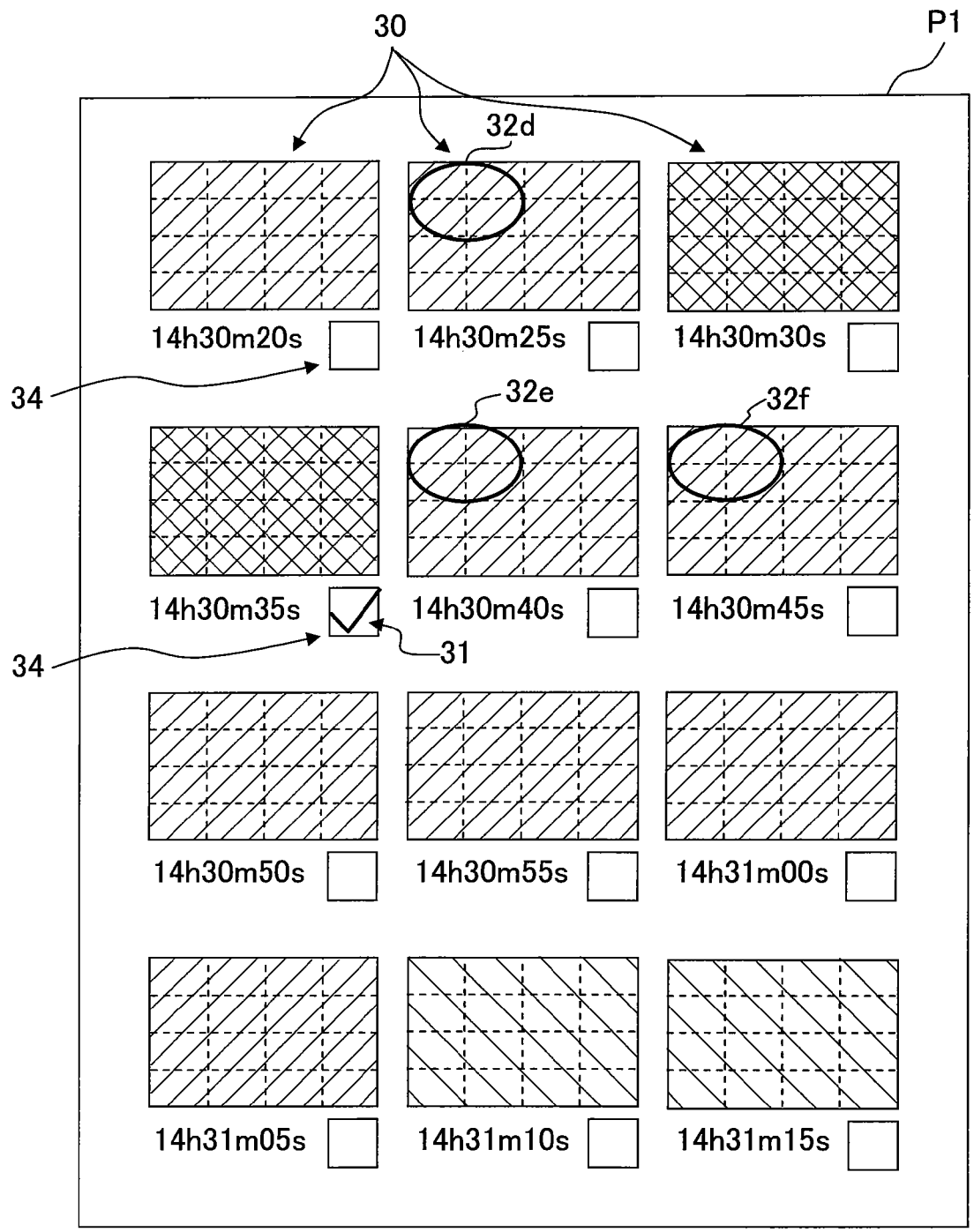
FIG. 16 shows a state in which a base image selection mark and correction position marks are marked to a printing paper sheet.

After that, as shown in FIG. 16, the base image selection mark 31 is marked by the user to the check box 34 corresponding to one thumbnail image 30. Further, the correction position marks 32 are marked to other thumbnail images 30 distinct from the thumbnail image 30 to which the mark 31 is marked. In this case, the correction position marks 32 (32*d* to 32*f*) are marked to identical positions (upper-left positions) of the three thumbnail images 30 positioned temporally before and after the thumbnail image 30 to which the mark 31 is marked.

When the printing paper sheet P1 is read by the scanner 4 (S33: Yes), the base image selection mark 31 and the correction position marks 32 are detected from the image data obtained by the scanner 4, by the image data-extracting section 25. However, if the image data-extracting section 25 fails in the detection of the marks 31, 32 (S34: No), the controller 45 allows the display 9 to show the error message to inform of the fact that the marks 31, 32 are not marked to the printing paper sheet P1 (S35).

When the image data-extracting section 25 detects the marks 31, 32 (S34: Yes), the base image-extracting section 26 extracts the base image data corresponding to the base image selection mark 31 (S36). Further, the correction data-extracting section 27 extracts the correction image data corresponding to the three correction position marks 32*d* to 32*f* respectively (S37). Further, the correction data-extracting section 27 cuts out, as the correction data from the three pieces of the extracted correction image data, the data corresponding to the positions (upper-left positions) to which the correction position marks 32 are marked (S38).

Subsequently, the image-combining section 28 combines the base image data with the three pieces of the correction data cut out from the three pieces of the correction image data respectively to generate three pieces of to-be-printed data (S39). Simultaneously, the image-combining section 28 generates three pieces of thumbnail image data corresponding to the three pieces of the to-be-printed data respectively. The three pieces of the to-be-printed data and the thumbnail image data thereof generated in this process are stored in the still image data storage section 24.

As shown in FIG. 17, the printing head 2 prints, on the printing paper sheet P3, the thumbnail images 60 (to-be-printed thumbnail images) of the three pieces of the to-be-printed data generated by the image-combining section 28 (S40: third printing step). In this process, the printing head 2 prints, on the printing paper sheet P3, the times of the base image data and the correction image data as the sources of the three to-be-printed thumbnail images 60 and the check boxes 64 corresponding to the three to-be-printed thumbnail images 60 respectively together with the three to-be-printed thumbnail images 60.

After that, as shown in FIG. 17, the predetermined printing selection mark 61 is marked by the user to the check box 64 of the thumbnail image 60 of the combined image intended to be finally printed. When the printing paper sheet P3 is read by the scanner 4 (S41: Yes), the printing selection mark 61 is detected from the image data obtained by the scanner 4, by the printing image-identifying section 46. However, if the printing image-identifying section 46 fails in the detection of the mark 61 (S42: No), the controller 45 allows the display 9 to show the error message to inform the user of the fact that the mark 61 is not marked to the printing paper sheet P1 (S43).

Figure 18:
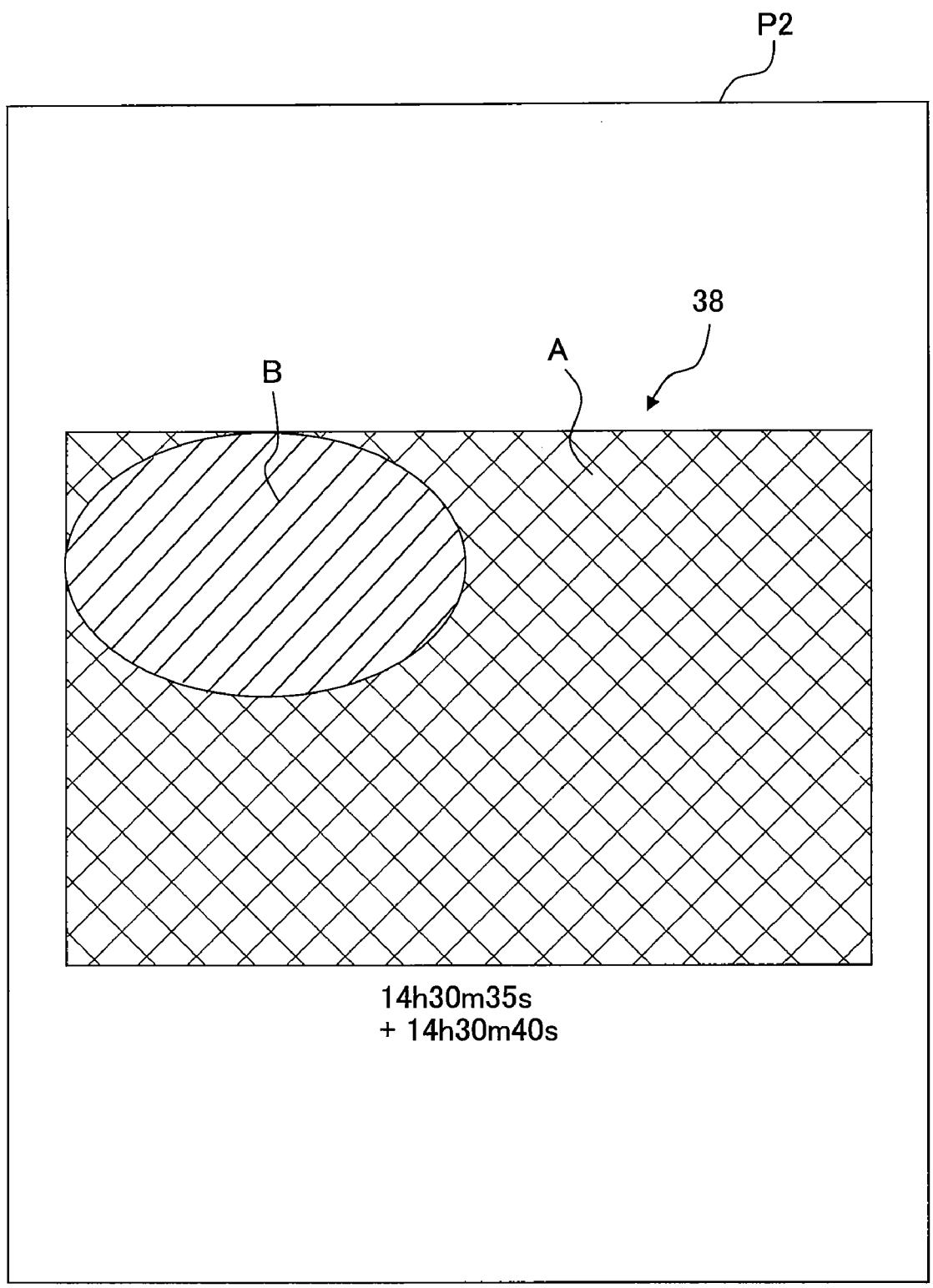
FIG. 18 shows a state in which a combined image is printed on a printing paper sheet.

If the printing image-identifying section 46 detects the printing selection mark 61 (S42: Yes), then the printing image-identifying section 46 identifies the to-be-printed thumbnail image 60 corresponding to the printing selection mark 61, of the three pieces of the to-be-printed data, and the printing image-identifying section 46 extracts the to-be-printed data corresponding to the thumbnail image 60 from the still image data storage section 24 (S44). Accordingly, as shown in FIG. 18, the printing head 2 prints, on the printing paper sheet P2, the image 38 of the extracted to-be-printed data (combined image data) (S45). In FIG. 18, the area A of the combined image 38 printed on the printing paper sheet P2 is the image of the still image data (base image data) at the point of time of 14 hours 30 minutes 35 seconds, and the area B is the image of the correction data cut out from the still image data (correction image data) at the point of time of 14 hours 30 minutes 40 seconds.

According to the multifunction printer 41 of the second embodiment described above, the plurality of pieces of the correction image data are extracted, the plurality of pieces of the to-be-printed data are generated from the correction data cut out from the correction image data, and the thumbnail images 60 of the to-be-printed data are printed on the printing paper sheet P3. Therefore, the most favorite one is selected by the user from the thumbnail images 60 of the plurality of pieces of the to-be-printed data (combined image data) printed on the printing paper sheet P3, and thus the more satisfactory image can be printed on the printing paper sheet P2.

In the second embodiment described above, the plurality of correction position marks 32 are marked by the user to the plurality of thumbnail images 30 printed on the printing paper sheet P1 (see FIG. 16), and thus the plurality of pieces of the still image data, which correspond to the plurality of thumbnail images 30 marked with the marks 32 respectively, are extracted as the correction image data. However, the correction image data may be extracted by any technique distinct therefrom.

Figure 19:
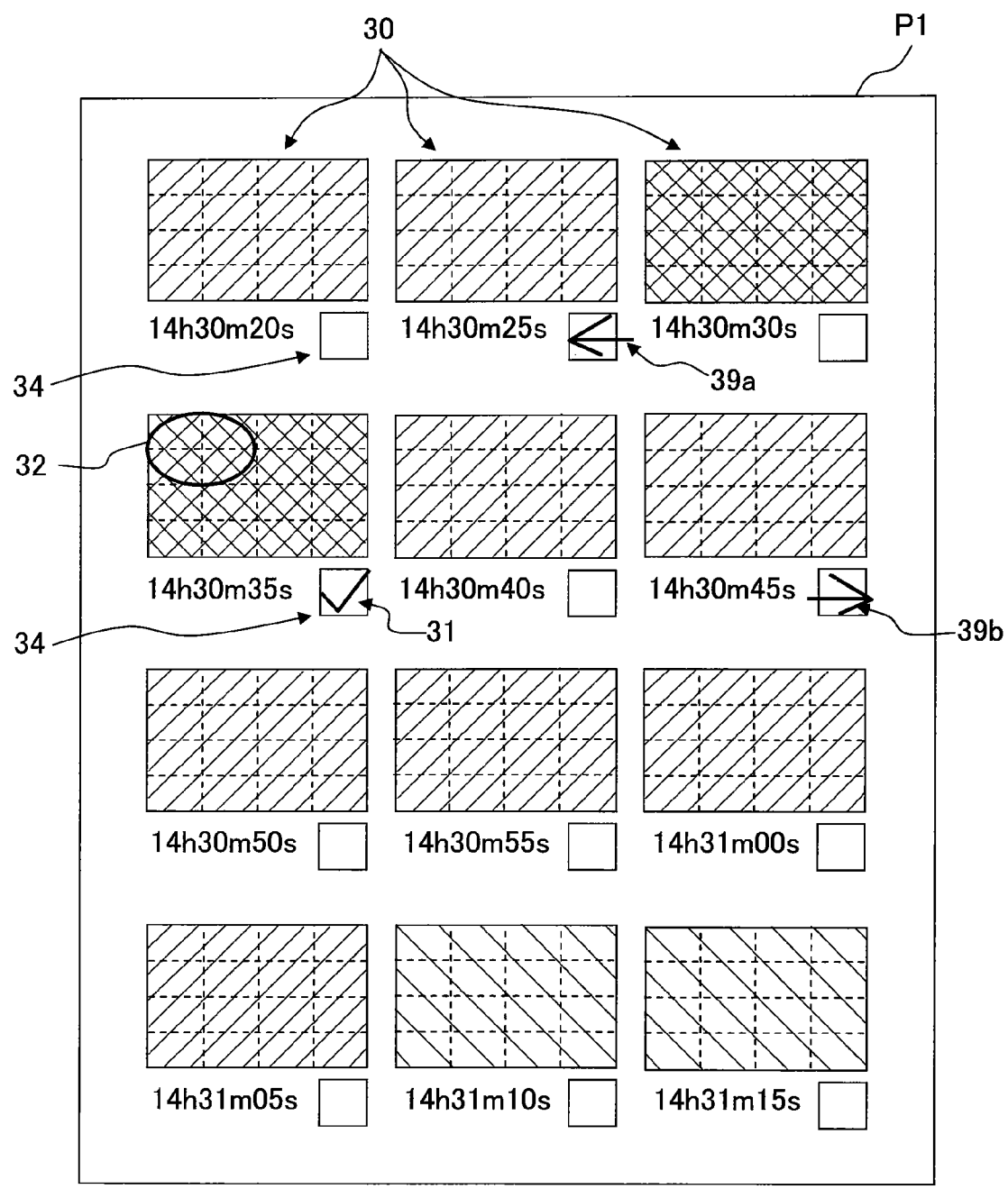
FIG. 19 shows a state in which a base image selection mark and a correction position mark are marked to a printing paper sheet in a modified embodiment of the second embodiment.

For example, as shown in FIG. 19, the base image selection mark 31 and the correction position mark 32 are marked to one thumbnail image 30 on the printing paper sheet P1. Separately from the marks 31, 32, correction image selection marks 39a, 39b, which are provided to instruct the correction image data, are marked to the check boxes 34 of the two thumbnail images 30 distinct from the thumbnail image 30 to which the base image selection mark 31 is marked respectively.

When the base image selection mark 31 and the correction position mark 32 are marked to one thumbnail image 30 as described above, the correction data-extracting section 27 judges that the correction position mark 32 merely indicates the position of the area to be corrected in the base image.

The correction data-extracting section 27 recognizes the correction image data to be extracted, from the correction image selection marks 39a, 39b. For example, as shown in FIG. 19, when the two correction image selection marks 39a, 39b are marked respectively to the two thumbnail images 30 which are separated temporally, a plurality of pieces of the still image data, which include the two pieces of the still image data corresponding to the two thumbnail images 30 marked with the marks 39a, 39b respectively and the still image data temporally disposed between the two pieces of the still image data, are extracted as the correction image data. Alternatively, only the two pieces of the still image data, which correspond to the two thumbnail images 30 marked with the two correction image selection marks 39a, 39b, may be extracted as the correction image data. When the correction image selection marks 39a, 39b are marked to the check boxes 34 as shown in FIG. 19, it is preferable that the two types of the marks are marked in different shapes so that the correction image selection marks 39a, 39b and the base image selection mark 31 are not confused.

Alternatively, the correction data-extracting section 27 may automatically adopt a plurality of still image data temporally positioned before and after the base image data, as the correction image data to be used for the correction of the base image.

Next, a third embodiment of the present invention will be explained. In the first and second embodiments described above, the controller of the multifunction printer performs all of the process for printing the still image. However, it is not necessarily indispensable that all of the process for printing the still image is performed by the multifunction printer singly. That is, the process for printing the still image may be realized by an entire printing system including the multifunction printer and an external control unit or controller which controls the multifunction printer.

Figure 20:
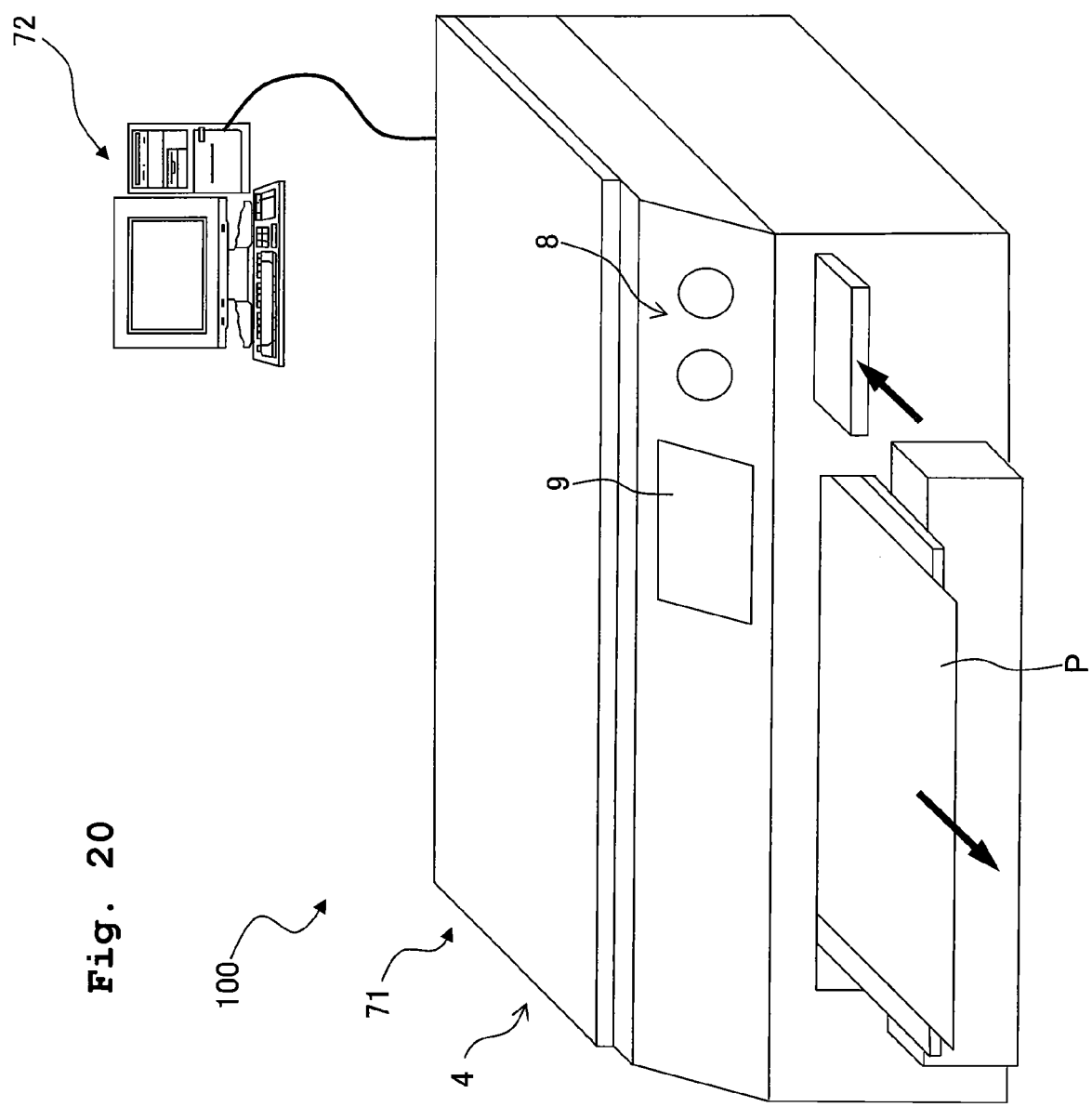
FIG. 20 shows a schematic arrangement illustrating a printing system according to a third embodiment.
Figure 21:
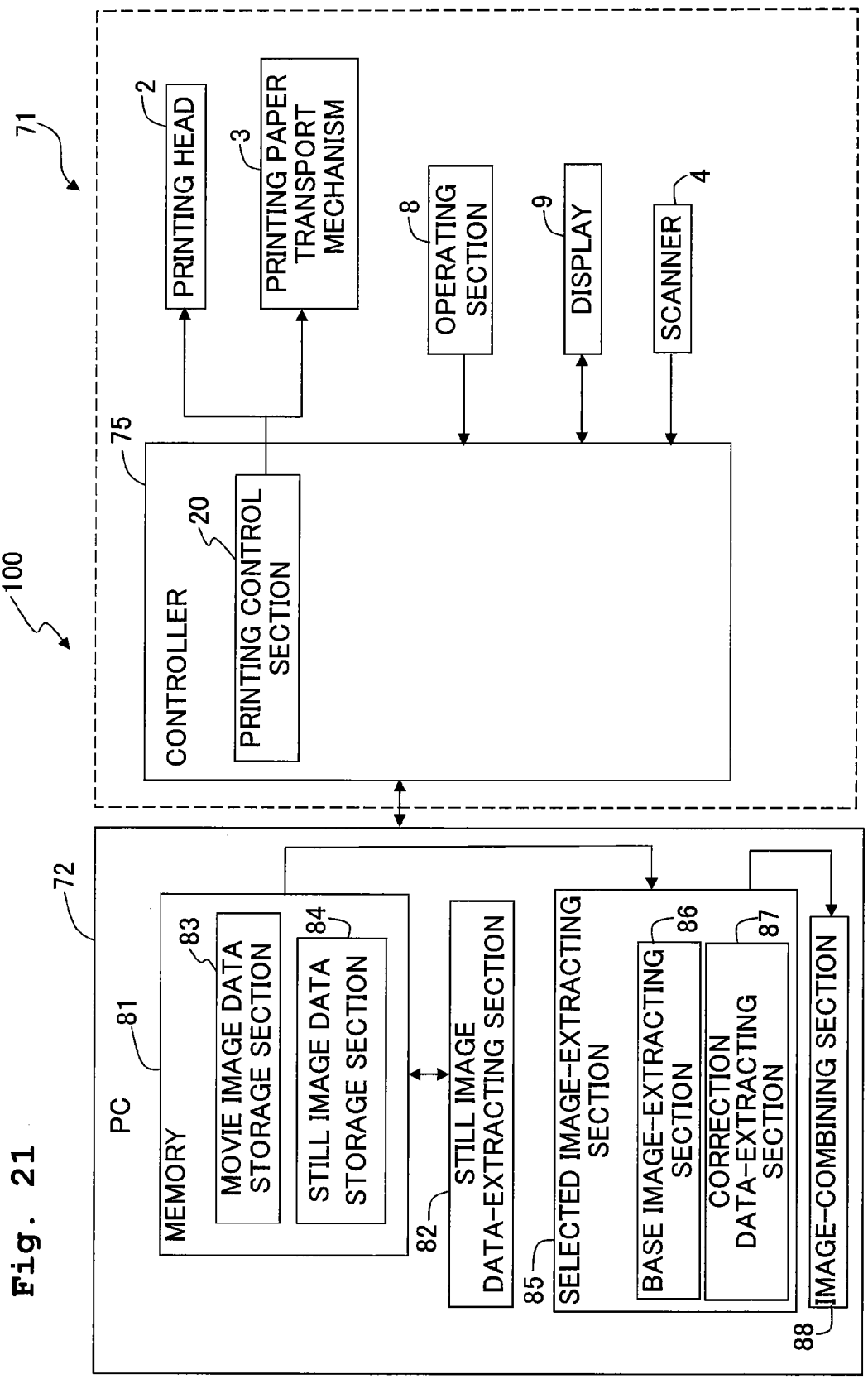
FIG. 21 shows a block diagram schematically illustrating an electric configuration of the printing system of the third embodiment.

As shown in FIGS. 20 and 21, the printing system 100 of the third embodiment comprises a multifunction printer 71 which has the printing head 2 and the scanner 4, and a personal computer 72 (PC: control unit or controller) which controls the multifunction printer 71.

The multifunction printer 71 has the printing head 2 and the scanner 4 as well as the printing paper transport mechanism 3, the operating section 8, the display 9, the controller 75 for controlling them, and other components. However, the multifunction printer 71 is principally constructed in the same manner as in the first embodiment described above. Therefore, any explanation thereof will be omitted. PC 72 is provided with, for example, CPU, ROM, RAM, and a mass storage device such as a hard disk. The mass storage device stores various types of data including, for example, movie image data and various application programs to be executed by CPU.

In the third embodiment, the still image data-extracting section 82, the movie image data storage section 83, the still image data storage section 84, the image data-extracting section 85 (base image-extracting section 86 and correction data-extracting section 87), and the image-combining section 88, which are provided in the controller of the multifunction printer in the first embodiment described above, are provided in PC 72. A storage section 81 (memory) of PC 72 includes the movie image data storage section 83 and the still image data storage section 84. The still image data-extracting section 82, the movie image data storage section 83, the still image data storage section 84, the image data-extracting section 85, and the image-combining section 88 are constructed, for example, by CPU, ROM, RAM, and the mass storage device of PC 72.

In other words, the program, which is stored in the mass storage device of PC 72, allows CPU of PC 72 to execute, for example, the base image-extracting step of extracting the base image data corresponding to the base image selection mark 31 (S16 in FIG. 3), the correction image-extracting step of extracting the correction image data corresponding to the correction position mark 32 (S17), the correction data-extracting step of cutting out the correction data from the correction image data (S18), and the image-combining step of combining the base image data and the correction data to generate the combined image data (S19).

According to the arrangement of the third embodiment, the function and the effect, which are to be consequently realized, are approximately the same as those of the first embodiment described above, in spite of such a difference that parts of the processes, which include, for example, the extraction of the base image data and the correction data and the image combination, are performed on the side of PC 72.

It is unnecessary that all of the still image data-extracting section, the movie image data storage section, the still image data storage section, the image data-extracting section, and the image-combining section are provided on the side of PC. Only a part or parts thereof may be provided in PC, and the remaining may be provided in the controller of the multifunction printer in the same manner as in the first embodiment described above.

In the embodiment and the modified embodiments of the present invention explained above, when the thumbnail images are printed in the thumbnail image-printing process (S12), the times of the pieces of the still image data are also printed together therewith. However, those printed together with the thumbnail image are not limited thereto. For example, it is also allowable that the frame numbers are printed. The image may be selected by the user and the image may be recognized on the device side based on the frame number.

In the embodiment and the modified embodiments of the present invention described above, the image-combining section 28, 88 may perform the correction so that the lightness and darkness of the coloration and/or the contrast may be equivalent in the vicinity of the boundary between the base image data and the correction data when the combined image data is generated.

Figure 22:
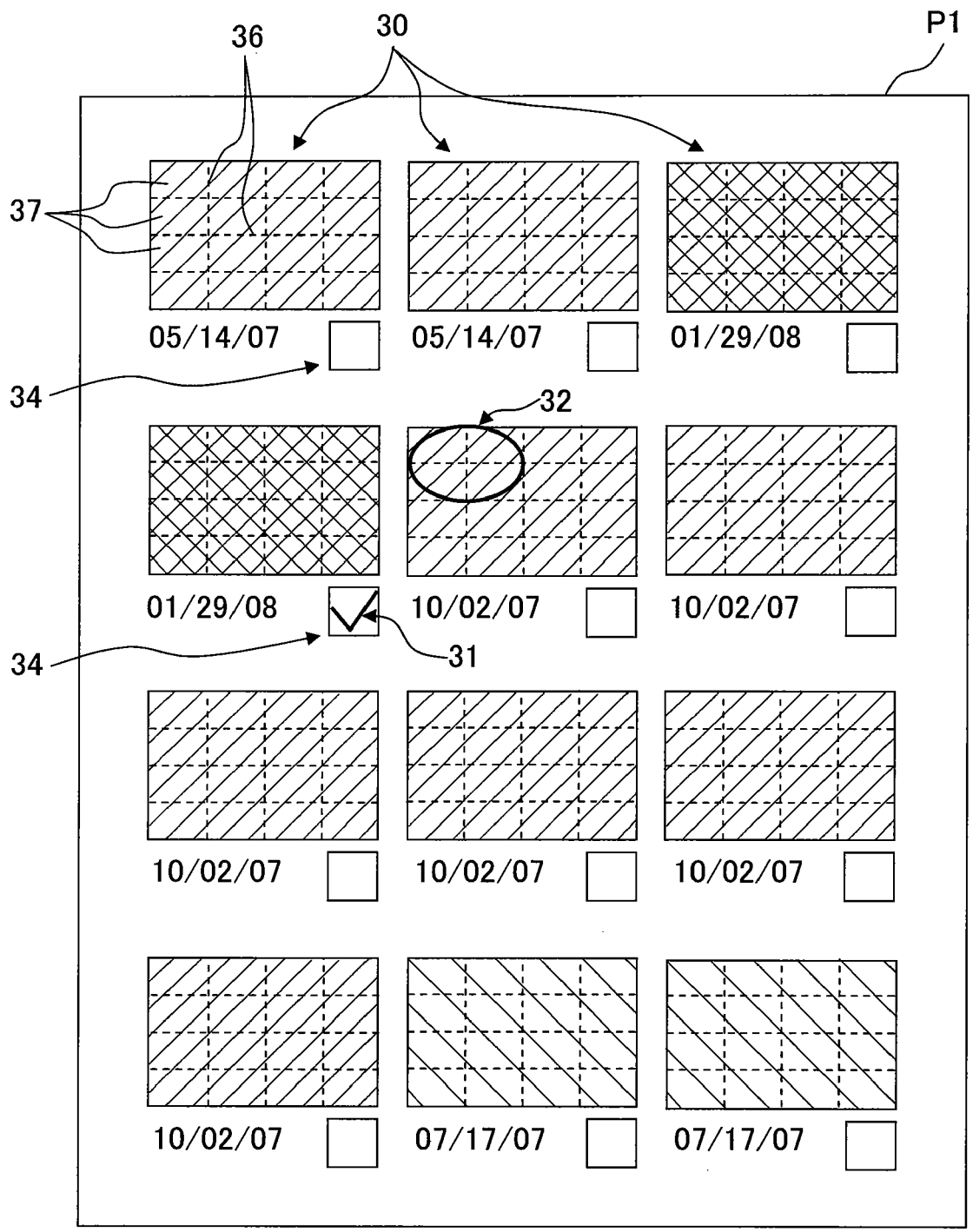
FIG. 22 shows a printing paper sheet marked with a base image selection mark and a correction position mark to be provided when the present invention is applied to a plurality of still images not arranged in a chronological order.

The embodiments of the present invention have been explained above as exemplified by such a case that the present invention is applied to the procedure for printing the images of the plurality of pieces of the still image data extracted from the movie image data. However, the plurality of pieces of the still image data to be printed are not limited to those extracted from the movie image data, provided that they are arranged in a chronological order. Further, it is also unnecessary that the plurality of pieces of the still image data are arranged in a chronological order. For example, the present invention is also applicable when a plurality of pieces of still image data, which are obtained by being photographed by a digital camera or the like, are stored in the storage means irrelevant to the times of being photographed. In this case, the still image data-extracting section 22 may extract pieces of still image data which are not arranged in a chronological order. As shown in FIG. 22, the printing head 2 may print, on the printing paper sheet P1, a plurality of thumbnail images 30 corresponding to the still image data extracted by the still image data-extracting section. For example, as shown in FIG. 22, the user may mark the base image selection mark 31 and the correction position mark 32 to the printing paper sheet P1 on which the plurality of thumbnail images 30 are printed in the same manner as in the embodiment or the modified embodiments.

In the embodiments of the present invention described above, when the thumbnail images are printed in the thumbnail image-printing process (S12, S32), the movie image data ID 33 and/or the group identification mark 35 are also printed together with the thumbnail images on the printing paper sheet P1. In order to increase the reading accuracy or the recognition speed of the scanner 4 during the reading process (S13, S33), symbols or marks indicating the left, right, top and bottom of the printing paper sheet P1 may also be printed on a margin of the printing paper sheet P1. Alternatively, the movie image data ID 33 and/or the group identification mark 35 may be printed on the printing paper sheet P1 as marks which also indicate the left, right, top and bottom of the printing paper sheet P1.

What is claimed is:
1. A multifunction printer comprising:
a scanner configured to read an image printed on a printing medium;
a memory configured to store a plurality of pieces of still image data;
a printing head configured to print, on a first printing medium, a plurality of thumbnail images corresponding to the plurality of pieces of the still image data stored in the memory;
an image data-extracting section which comprises:
a base image-extracting section, and
a correction data-extracting section,
wherein the base image-extracting section is configured to extract, as base image data, one of the plurality of pieces of still image data corresponding to one of the plurality of thumbnail images marked with a base image selection mark when the scanner reads the first printing medium after the predetermined base image selection mark is marked to the one of the plurality of thumbnail images and a predetermined correction position mark is marked to a partial area of at least one of the thumbnail images,
wherein the correction data-extracting section is configured to extract at least one piece of the still image data, as correction image data, from the plurality of pieces of the still image data stored in the memory, and
wherein the correction data-extracting section is configured to cut out, from the correction image data, data corresponding to the partial area marked with the predetermined correction position mark as correction data for correcting a part of the base image data; and
an image-combining section configured to combine the base image data extracted by the base image-extracting section with the correction data extracted by the correction data-extracting section to generate combined image data, wherein:
the printing head is configured to print, on the first printing medium together with the plurality of thumbnail images, a movie image identification mark, which is provided to identify movie image data,
the image data-extracting section is configured to recognize, based on the movie image identification mark, the movie image data, from which the image data-extracting section is configured to extract the base image data and the correction image data,
the printing head is configured to print, on a second printing medium, an image of the combined image data generated by the image-combining section,
the correction data-extracting section is configured to extract two or more pieces of the correction image data from the plurality of pieces of the still image data stored in the memory,
the correction data-extracting section is configured to cut out two or more pieces of the correction data, each of which corresponds to the partial area, from the two or more pieces of the correction image data,
the image-combining section is configured to combine the base image data and the two or more pieces of the correction data with each other to generate two or more pieces of to-be-printed data and, simultaneously, to generate thumbnail image data corresponding to the two or more pieces of to-be-printed data,
the printing head is configured to print two or more to-be-printed thumbnail images, which correspond to the thumbnail image data corresponding to the two or more pieces of to-be-printed data, on a third printing medium,
the multifunction printer further comprises a printing image-identifying section configured to identify a spe- cific to-be-printed data from the two or more pieces of to-be-printed data when the scanner reads the third printing medium, the specific to-be-printed data corresponds to a predetermined printing selection mark marked to one of the two or more to-be-printed thumbnail images printed on the third printing medium, the printing head is configured to print an image of the specific to-be-printed data identified by the printing image-identifying section on the second printing medium, and the printing head is configured to print, on a margin of the first printing medium together with the plurality of thumbnail images, one of symbols and marks which indicate the left, right, top, and bottom of the first printing medium.

2. The multifunction printer according to claim 1, wherein the plurality of pieces of the still image data stored in the memory are arranged in a chronological order.

3. The multifunction printer according to claim 2, wherein when the base image selection mark and the correction position mark are marked respectively to the thumbnail images which are different from each other, the correction data-extracting section extracts, as the correction image data, the still image data corresponding to the thumbnail image marked with the correction position mark.

4. The multifunction printer according to claim 2, wherein when the base image selection mark and the correction position mark are marked to the same thumbnail image, the still image data, which is different from the still image data corresponding to the thumbnail image marked with the correction position mark, is extracted as the correction image data by the correction data-extracting section.

5. The multifunction printer according to claim 2, wherein when the correction position mark is marked onto the thumbnail image, the data, which is included in the correction image data and which corresponds to an area including the correction position mark on the thumbnail image, is cut out as the correction data by the correction data-extracting section.

6. The multifunction printer according to claim 5, wherein when the correction position mark is marked to surround a part of the thumbnail image, the data, which corresponds to the area surrounded by the correction position mark of the thumbnail image, is cut out as the correction data from the correction image data by the correction data-extracting section.

7. The multifunction printer according to claim 5, wherein computing lines, which compart each of the thumbnail images into a plurality of block areas, are printed together with the plurality of thumbnail images on the first printing medium by the printing head, and the data, which corresponds to the block area including the correction position mark of the thumbnail image, is cut out as the correction data from the correction image data by the correction data-extracting section.

8. The multifunction printer according to claim 2, wherein the plurality of pieces of the still image data are classified into a plurality of groups, a group identification mark, which corresponds to each of the plurality of groups, is printed by the printing head on one sheet of the first printing medium together with the thumbnail images of the still image data belonging to the group, and the group, from which the base image data and the correction image data are to be extracted, is recognized by the image data-extracting section from the group identification mark printed on the first printing medium.

9. A printing system comprising the multifunction printer as defined in claim 2, and a controller which controls the multifunction printer.

10. A non-transitory computer readable medium storing a still image-printing program which is usable for a multifunction printer including a printing head for printing an image on a printing medium and a scanner for reading the image printed on the printing medium, and which configures the multifunction printer to execute steps comprising:

a first printing step for printing, on a first printing medium, a movie image identification mark, which is provided to identify movie image data, together with a plurality of thumbnail images corresponding to a plurality of pieces of still image data stored in a memory, and the first printing step further comprises printing, on a margin of the first printing medium together with the plurality of thumbnail images, one of symbols and marks which indicate the left, right, top and bottom of the first printing medium;

an image data-extracting step to be executed when the first printing medium is read by the scanner after a base image selection mark has been marked to one of the plurality of thumbnail images on the first printing medium and a predetermined correction position mark has been marked to a partial area of at least one of the thumbnail images, the image data-extracting step including:

a base image-extracting step for extracting, as base image data, a piece of the still image data corresponding to the thumbnail image marked with the base image selection mark, from the plurality of pieces of the still image data stored in the memory;

a correction data-extracting step for extracting, as correction image data, two or more pieces of the still image data from the plurality of pieces of the still image data stored in the memory and cutting out two or more pieces of correction data for partially correcting the base image data, each of which corresponds to the partial area marked with the correction position mark, from the two or more pieces of the correction image data, wherein the base image data and the correction image data are extracted from the movie image data, which is recognized from the movie image identification mark printed on the first printing medium;

an image-combining step for generating two or more pieces of to-be-printed data by combining the base image data extracted in the base image-extracting step and the two or more pieces of the correction data cut out in the correction data-extracting step;

a thumbnail image-generating step for generating thumbnail image data corresponding to the two or more pieces of to-be-printed data simultaneously with the image-combining step;

a second printing step for printing two or more to-be-printed thumbnail images, which correspond to the thumbnail image data corresponding to the two or more pieces of to-be-printed data, on a second printing medium;

a printing image-identifying step for identifying a specific to-be-printed data from the two or more pieces of to-be-printed data when reading the second printing medium, wherein the specific to-be-printed data corresponds to a predetermined printing selection mark marked to one of the two or more to-be-printed thumbnail images printed on the second printing medium; and a third printing step for printing, on a third printing medium, an image of the specific to-be-printed data identified in the printing image-identifying step by the printing head.

11. The non-transitory computer readable medium according to claim 10, wherein the plurality of pieces of the still image data stored in the memory are arranged in a chronological order.

12. The non-transitory computer readable medium according to claim 11, wherein when the base image selection mark and the correction position mark are marked respectively to the thumbnail images which are different from each other, the still image data corresponding to the thumbnail image marked with the correction position mark is extracted as the correction image data in the correction data-extracting step.

13. The non-transitory computer readable medium according to claim 11, wherein when the base image selection mark and the correction position mark are marked to the same thumbnail image, the still image data, which is different from the still image data corresponding to the thumbnail image marked with the correction position mark, is extracted as the correction image data in the correction data-extracting step.

14. The non-transitory computer readable medium according to claim 11, wherein when the correction position mark is marked onto the thumbnail image, the data, which is included in the correction image data and which corresponds to an area including the correction position mark on the thumbnail image, is cut out as the correction data in the correction data-extracting step.

15. The non-transitory computer readable medium according to claim 14, wherein when the correction position mark is marked to surround a part of the thumbnail image, the data, which is included in the correction image data and which corresponds to the area surrounded by the correction position mark of the thumbnail image, is cut out as the correction data in the correction data-extracting step.

16. The non-transitory computer readable medium according to claim 14, wherein comparting lines, which compart each of the thumbnail images into a plurality of block areas, are printed together with the plurality of thumbnail images on the first printing medium by the printing head in the first printing step, and the data, which is included in the correction image data and which corresponds to the block area including the correction position mark of the thumbnail image, is cut out as the correction data in the correction data-extracting step.

17. The non-transitory computer readable medium according to claim 11, wherein the plurality of pieces of the still image data are classified into a plurality of groups, a group identification mark, which corresponds to each of the plurality of groups, is printed by the printing head on one sheet of the first printing medium together with the thumbnail images of the still image data belonging to the group in the first printing step, and the group, from which the base image data and the correction image data are to be extracted, is recognized in the image data-extracting step from the group identification mark printed on the first printing medium.

18. The multifunction printer according to claim 1, wherein the image-combining section performs correction so that at least one of the lightness/darkness and the contrast of coloration is equivalent in the vicinity of a boundary of the base image data and the correction data when the combined image data is generated.

19. The non-transitory computer readable medium according to claim 10, wherein in the image-combining step, correction is performed so that at least one of the lightness/darkness and the contrast of coloration is equivalent in the vicinity of a boundary of the base image data and the correction data.

* * * * *